(12) United States Patent
Phadke et al.

(10) Patent No.: US 10,984,420 B2
(45) Date of Patent: *Apr. 20, 2021

(54) TRANSACTION DEVICE

(71) Applicants: Sujay Abhay Phadke, Sunnyvale, CA (US); Binata Abhay Phadke, Pune (IN)

(72) Inventors: Sujay Abhay Phadke, Sunnyvale, CA (US); Binata Abhay Phadke, Pune (IN)

( * ) Notice: Subject to any disclaimer, the term of this patent is extended or adjusted under 35 U.S.C. 154(b) by 384 days.

This patent is subject to a terminal disclaimer.

(21) Appl. No.: 15/459,714

(22) Filed: Mar. 15, 2017

(65) Prior Publication Data

US 2018/0268412 A1    Sep. 20, 2018

(51) Int. Cl.
*G06Q 20/40* (2012.01)
*G06Q 20/32* (2012.01)

(52) U.S. Cl.
CPC ..... *G06Q 20/40145* (2013.01); *G06Q 20/322* (2013.01)

(58) Field of Classification Search
CPC ............ G06Q 20/20; G06Q 20/40145; G06Q 20/3674; G06Q 20/4014; G06Q 20/425; G06Q 20/40; G06Q 20/18
See application file for complete search history.

(56) References Cited

U.S. PATENT DOCUMENTS 5,548,648 A * 8/1996 Yorke-Smith ......... H04L 9/0869
380/29
5,615,277 A   3/1997 Hoffman
(Continued)

FOREIGN PATENT DOCUMENTS

WO         0045247 A1    8/2000
WO    WO-2006111205 A1 * 10/2006   ......... G06F 21/6254

OTHER PUBLICATIONS

Dobromir Todorov, Mechanics of User Identification and Authentication, Chapter 1, (ISBN 9780429133138), 2007 (Year: 2007).*
(Continued)

*Primary Examiner* — Eric T Wong
*Assistant Examiner* — Claire A Rutiser
(74) *Attorney, Agent, or Firm* — Douglas L. Weller

(57) ABSTRACT

A transaction system performs a transaction for a purchase of goods or services. Information about a purchase of goods or services is displayed on a display of a transaction device. The transaction device receives from a user, primary identification data which comprises biometric data that identifies the user. The transaction device receives from the user, secondary identification data which identifies the user. The secondary identification data is in addition to the primary identification data, and the secondary identification is of a different type than the primary identification data. A primary biometric identification parameters database is accessed to verify identification of the user. A secondary identification parameters database is accessed to confirm identification of the user. The transaction device provides to the user a transaction failure message when either the access to the primary biometric identification parameters database fails to verify identification of the user or the access to the secondary identification parameters database fails to confirm identification of the user.

20 Claims, 31 Drawing Sheets

(56) References Cited

U.S. PATENT DOCUMENTS

| | | | |
|---|---|---|---|
| 5,802,199 A | | 9/1998 | Pare, Jr. et al. |
| 5,838,812 A | | 11/1998 | Pare, Jr. et al. |
| 6,594,376 B2 | * | 7/2003 | Hoffman ............... G06K 9/6255 |
| | | | 382/115 |
| 6,662,166 B2 | | 12/2003 | Pare, Jr. et al. |
| 6,920,435 B2 | | 7/2005 | Hoffman et al. |
| 7,269,737 B2 | | 9/2007 | Robinson |
| 7,330,871 B2 | | 2/2008 | Barber |
| 7,366,702 B2 | | 4/2008 | David |
| 7,502,761 B2 | | 3/2009 | Siegel et al. |
| 7,512,567 B2 | * | 3/2009 | Bemmel ................ G06Q 20/20 |
| | | | 705/64 |
| 7,536,352 B2 | | 5/2009 | Kaosket et al. |
| 8,443,200 B2 | | 5/2013 | Karthik |
| 8,752,153 B2 | | 6/2014 | Vysogorets et al. |
| 9,495,526 B2 | * | 11/2016 | Hanna ..................... G06F 21/32 |
| 2003/0046237 A1 | | 3/2003 | Uberti |
| 2005/0165700 A1 | * | 7/2005 | Karthik ................ G06Q 20/382 |
| | | | 705/67 |
| 2005/0187883 A1 | | 8/2005 | Bishop et al. |
| 2005/0210269 A1 | * | 9/2005 | Tiberg ................ H04L 63/0861 |
| | | | 713/186 |
| 2006/0046842 A1 | | 3/2006 | Mattice et al. |
| 2006/0064380 A1 | | 3/2006 | Zukerman |
| 2007/0038863 A1 | | 2/2007 | Nguyen et al. |
| 2007/0214093 A1 | | 9/2007 | Colella |
| 2007/0257100 A1 | * | 11/2007 | Chase-Salerno ..... G06Q 20/341 |
| | | | 235/380 |
| 2008/0271116 A1 | | 10/2008 | Robinson et al. |
| 2009/0205033 A1 | | 8/2009 | Lapsley et al. |
| 2009/0217035 A1 | | 8/2009 | Abdul Hameet Khan |
| 2010/0153273 A1 | | 6/2010 | Sellars et al. |
| 2010/0246902 A1 | | 9/2010 | Rowe et al. |
| 2012/0032782 A1 | | 2/2012 | Colella |
| 2012/0136793 A1 | | 3/2012 | Valin et al. |
| 2012/0297184 A1 | * | 11/2012 | Greer .................... H04L 9/3231 |
| | | | 713/155 |
| 2012/0305503 A1 | * | 12/2012 | Smith .................... G06F 1/1637 |
| | | | 211/26 |
| 2013/0036458 A1 | | 2/2013 | Liberman et al. |
| 2013/0282589 A1 | | 10/2013 | Shoup et al. |
| 2014/0222596 A1 | | 8/2014 | S. |
| 2015/0332273 A1 | * | 11/2015 | Bruno ............. G06Q 20/40145 |
| | | | 705/44 |
| 2016/0171199 A1 | | 6/2016 | Beatson et al. |
| 2016/0335628 A1 | | 11/2016 | Weigold |
| 2016/0373419 A1 | | 12/2016 | Weigold et al. |
| 2017/0357981 A1 | * | 12/2017 | Azzam ............. G06Q 20/40145 |

OTHER PUBLICATIONS

Park et. al, A study on iris localization and recognition on mobile phones. EURASIP Journal on Advances in Signal Processing, Issue: 1, vol. 2008, pp. 281943. Oct. 16, 2007 (Year: 2007).*

Todorov, Mechanics of User Identification and Authentication: Fundamentals of Identity Management. Chapter 1: User identification and authentication concepts. Auerbach Publications, Jun. 18, 2007 (Year: 2007).*

Guerra-Casanova, et. al, Authentication in mobile devices through hand gesture recognition. International Journal of Information Security, Issue: 2, vol. 11, pp. 65-83. Jan. 20, 2012 (Year: 2012).*

* cited by examiner

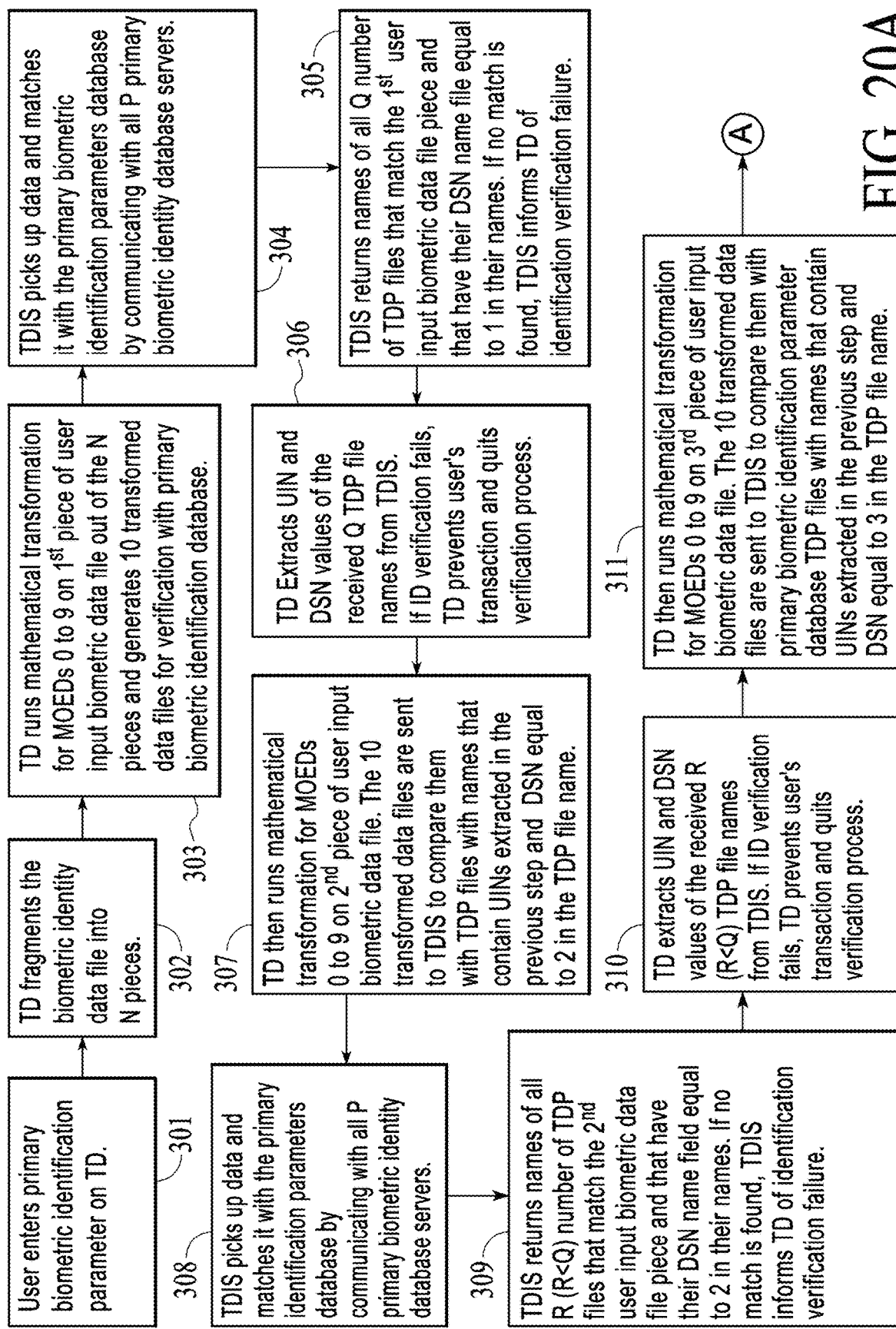

TRANSACTION DEVICE

BACKGROUND

For commercial transactions for purchases such as those made at stores, restaurants and other commercial establishments and for commercial transactions for services, such as for transportation or home repairs, payments are typically made using cash, checks, credit cards, debit cards, or apps stored on mobile phones. The variety of way to make payments are the result of the search to provide for the convenience of those making payments, assurance of the integrity of payments for those receiving payments and the security of all parties involved directly or indirectly in commercial transactions.

BRIEF DESCRIPTION OF THE DRAWINGS

FIG. 20A and FIG. 20B illustrate verification of a user biometric identity during a transaction using a transaction device in accordance with an implementation.

DETAILED DESCRIPTION

A phoneless universal transaction system allows a user to perform transactions without the use of a personal mobile device. The commercial transactions can be standard transactions such as bank withdrawals, grocery purchases, payment for transportation services, verification of passport and ticket details at airports, making phone calls, calling cab, sending email and so on.

The transaction system performs identification and transaction functions. The transaction can be implemented using various architectures. For example, in a first architecture, a transaction device directly accessed by a user performs the identification verification and transaction functions. In a second architecture, a transaction device directly accessed by a user performs the identification verification while a transaction device interface server (TDIS) performs transaction functions. In a third architecture, a transactions device interfaces with a user while a TDIS performs the identification verification and transaction functions.

Biometric data and secondary identity data used to identify a user is encrypted when stored and when performing transactions. The transaction system, for example, uses a unique identification number (UIN), a data sequence number (DSN) and a mathematical operation encryption number (MOEN) when encrypting and decrypting data, as explained further below. For example, a user's Biometric data and secondary identity data is re-encrypted at random time intervals to prevent hacking.

Figure 1:
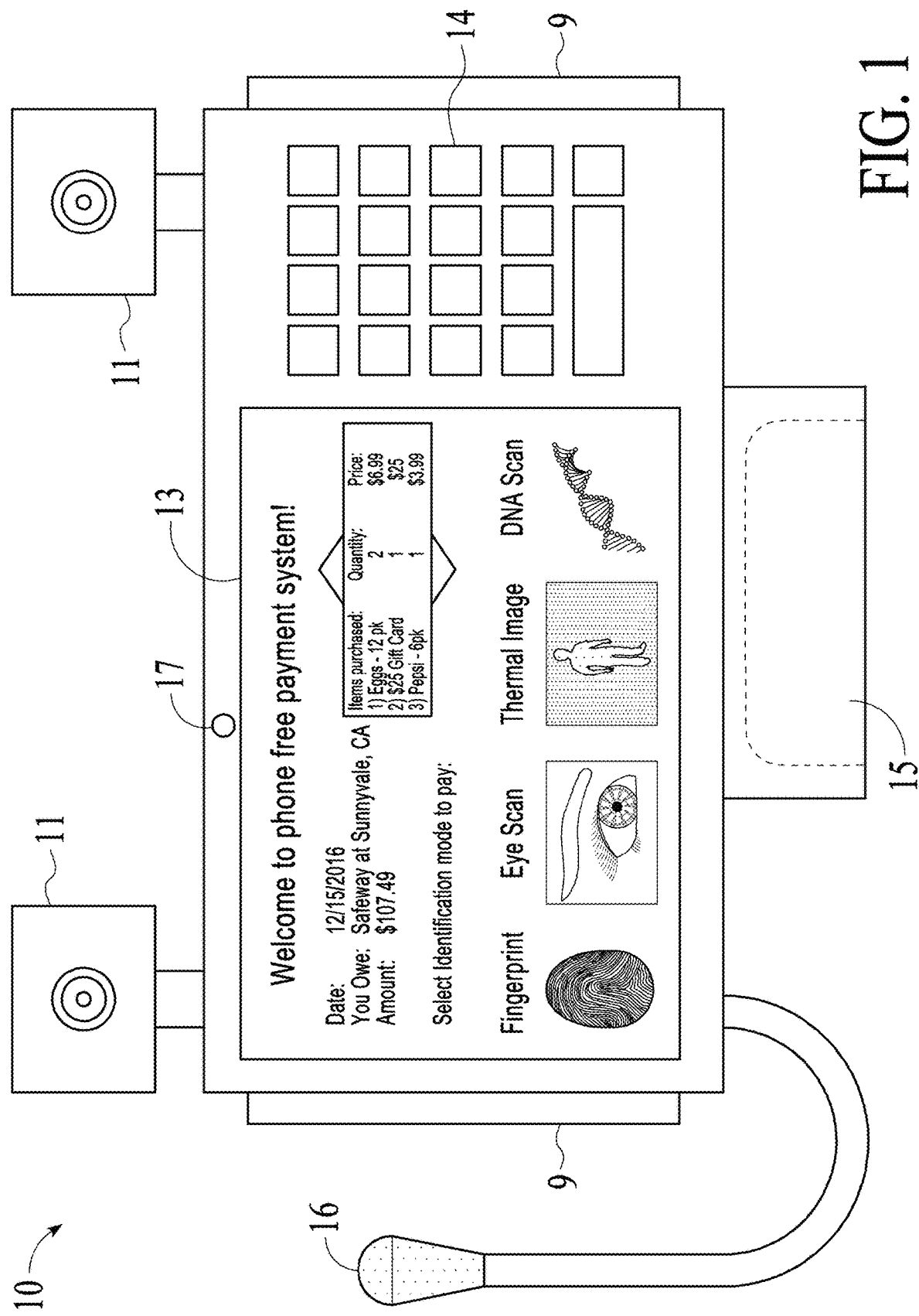
FIG. 1 is a simplified diagram of an interface for a transaction device in accordance with an implementation.
Figure 2:
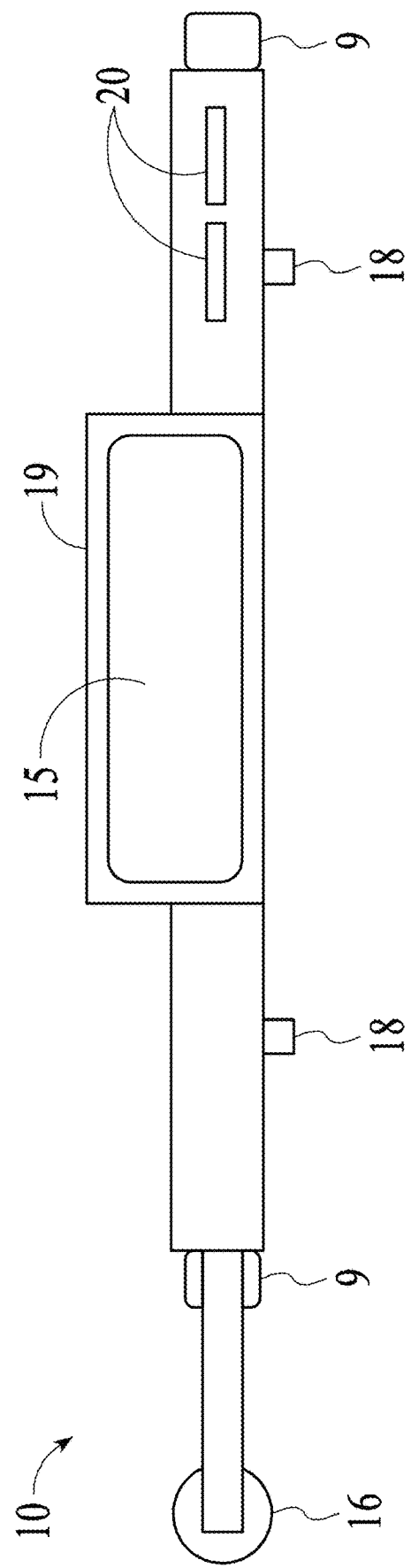
FIG. 2 is a simplified block diagram of a portion of an interface for a transaction device in accordance with an implementation.

FIG. 1 is a simplified diagram of an interface for a transaction device 10 used for transactions. The interface for transaction device 10 incudes, for example, a display 13, a key pad 14, a camera 17, a microphone 16, additional cameras 11, speakers 9 and a fingerprint sensor 15. For example, fingerprint sensor 15 includes a scanner that scans finger tips to collect fingerprints. For example, display 13 is a touchscreen display. For example, additional cameras 11 are used for retina and facial recognition FIG. 2 is a simplified block diagram showing additional detail of a portion of the interface for transaction device 10. In addition to microphone 16, FIG. 2 shows speakers 9 and attachments 18 that serve as attachment points to physically anchor and secure transaction device 10 to a surface or stationary object. Ports 20 are external ports allowing connection of transaction device 10 to additional sensors. Fingerprint sensor 15 is shown to include a hood 19 that provides for the display of fingerprint sensor 15 to be within a cavity. The cavity prevents ambient light from affecting fingerprint imaging. A width of fingerprint sensor 15 and of the sensor cavity is selected, for example, to be sufficiently large to allow a user to scan multiple fingers simultaneously.

Figure 3:
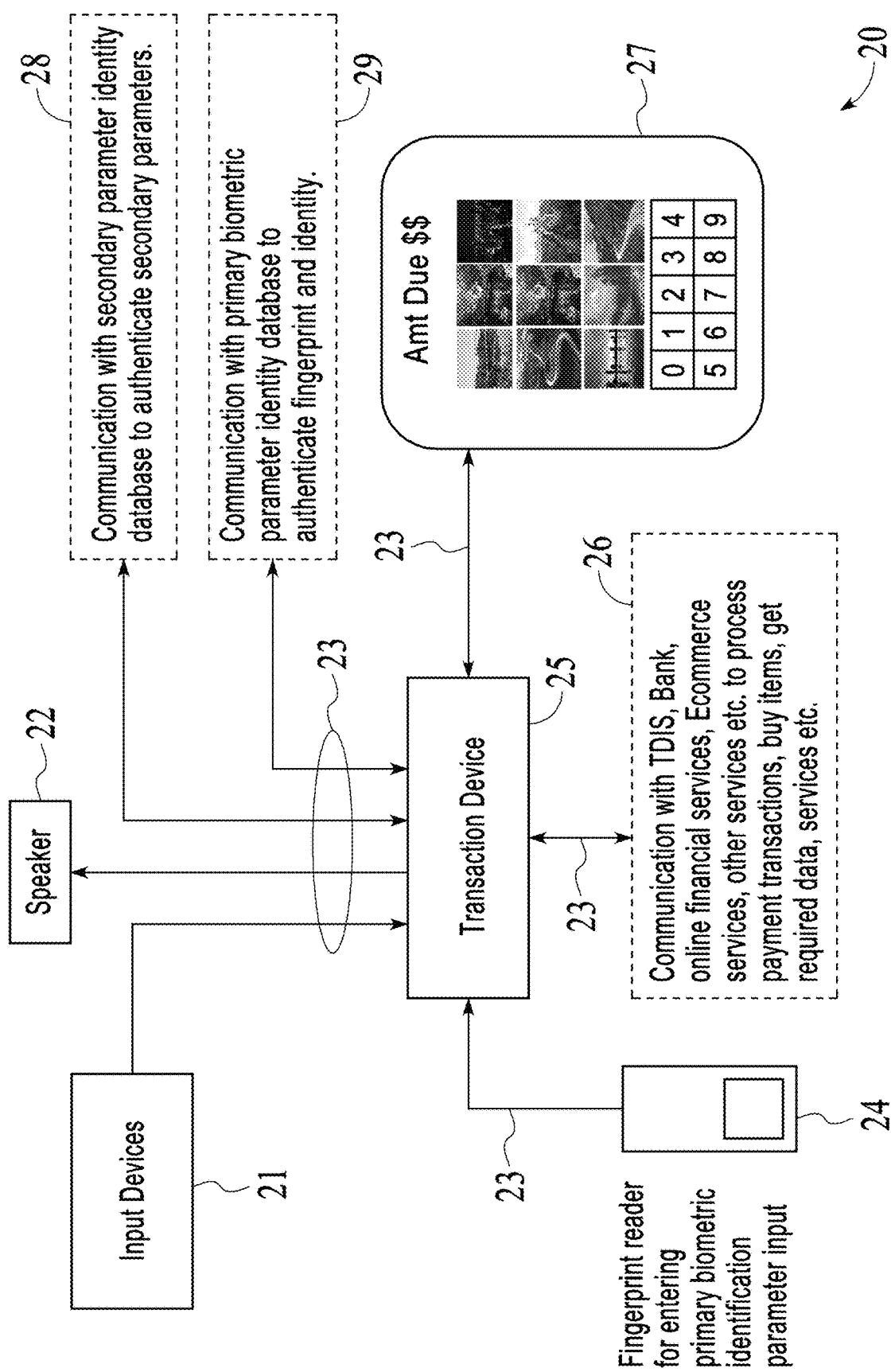
FIG. 3 is a simplified block diagram showing arrangement of components for a transaction device in accordance with an implementation.

FIG. 3 is a simplified block diagram showing an exemplary arrangement of components for a transaction device 20. A transaction device computer 25 is connected to other components of transaction device through communication connections 23. For example, communication connections 23 can be implemented through wired or wireless connection using various protocols such as Ethernet (e.g. any type of IEEE 802.3 network), Wi-Fi (IEEE 802.11a, 802.11b, 802.11c, etc.), Bluetooth, USB, serial port, parallel port or other standard or proprietary protocols.

For example, transaction device computer 25 can be compatible with any standard operating system such as UNIX, Mac OS, MS Windows, Linux, IOS, Android, Symbian or another commercially available or proprietary operating system. For example, transaction device computer includes a CPU, RAM, ROM, hard disk storage, and other standard module and peripherals that are associated with commercially available computers or other smart devices.

Input devices for transaction device 20 include, for example, a camera, a microphone, a key pad, a thermal sensor, a DNA sensor, a retina scanner, radio frequency identification (RFID) reader and/or other devices that allow a user to input information used for recognizing and identifying a user. The recognition can be, for example, by voice print, retina scan, DNA identification, passcode, RFID, etc. A fingerprint scanner 24 is used, for example, as a primary biometric identification parameter input.

One or more speakers 22 provide communication to a user including instructions and/or interactive feedback. A display interface 20 includes, for example, a touchscreen, keypad, keyboard, mouse, voice command capability and so on. Display interface 20 provides, for example, information about a transaction, including amount due, and accepts picture codes, numerical codes, pass codes and/or other input. For example, information received from a user by display interface 20 can serve as secondary identification parameter inputs.

Transaction device 25 can have various communication channels. For example, FIG. 3 shows a communication channel 28 that provides communication with a secondary parameter identity database to authenticate secondary parameters. A communication channel 29 provides communication with a primary biometric parameter identity database used to authenticate fingerprint and biometric identity of a user. A communication channel 26 provides for communication with a commercial entity such as a transaction device interface server, a bank, an online financial service provider, an ecommerce service provider, airport security server and so on, that can provide services to process payments transactions, provide items or services for sale and provide other required services such as providing information about passenger, items or services.

Figure 4:
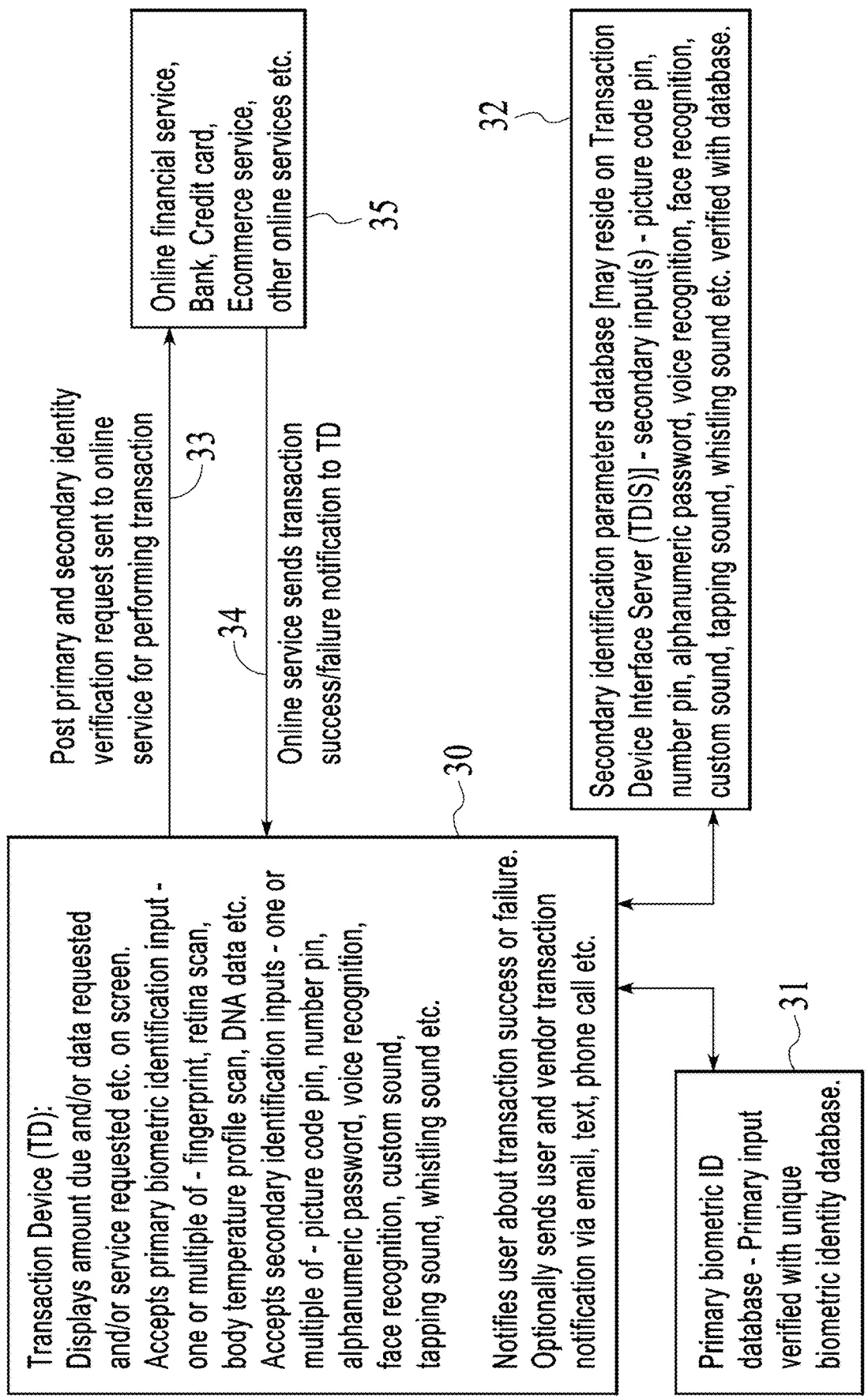
FIG. 4 is a simplified diagram showing architecture of a transaction device in accordance with an implementation.

FIG. 4 is a simplified diagram showing a first example architecture of a transaction device system that includes a transaction device 30. For example, transaction device 30 displays an amount due and/or data requested and/or service(s) requested and/or other information on a display screen. Transaction device 30 accepts primary biometric identification. For example, primary biometric identification can be one or more of fingerprint, retina scan, body temperature profile scan, DNA data, and so on. Transaction device 30 also accepts secondary identification inputs. For example, secondary identification inputs can include a picture code pin, number pin, alpha numeric password, voice recognition, face recognition, a custom sound provided by a user, a tapping pattern provided by user, a whistling sound provided by user, RFID tag scan and so on. Transaction device 30 notifies a user about transaction success or failure. Optionally, transaction device 30 sends a user and vendor transaction notification, for example, via email, text, phone call and so on.

A primary biometric identification parameters database 31 provides verification for primary biometric identification obtained from the user by comparing the primary biometric identification obtained from the user with information stored in primary biometric identification parameters database 31.

A secondary identification parameters database 32 provides verification for secondary identification parameters obtained from the user by comparing secondary identification parameters obtained from the user with information stored in secondary identification parameters database 32. Secondary parameters can include, for example, a picture code pin, number pin, alpha numeric password, voice recognition, face recognition, a custom sound provided by a user, a tapping pattern provided by customer, a whistling sound provided by user and so on.

An arrow 33 represents post primary and secondary identity verification request sent to an online service 35 for performing a transaction. Online service 35 is, for example, an online financial service, a bank, a credit card processor, an ecommerce service, airport security service or another type of provider of online services. An arrow 34 represents online service 35 sending a transaction success or failure notification to transaction device 30.

Figure 5:
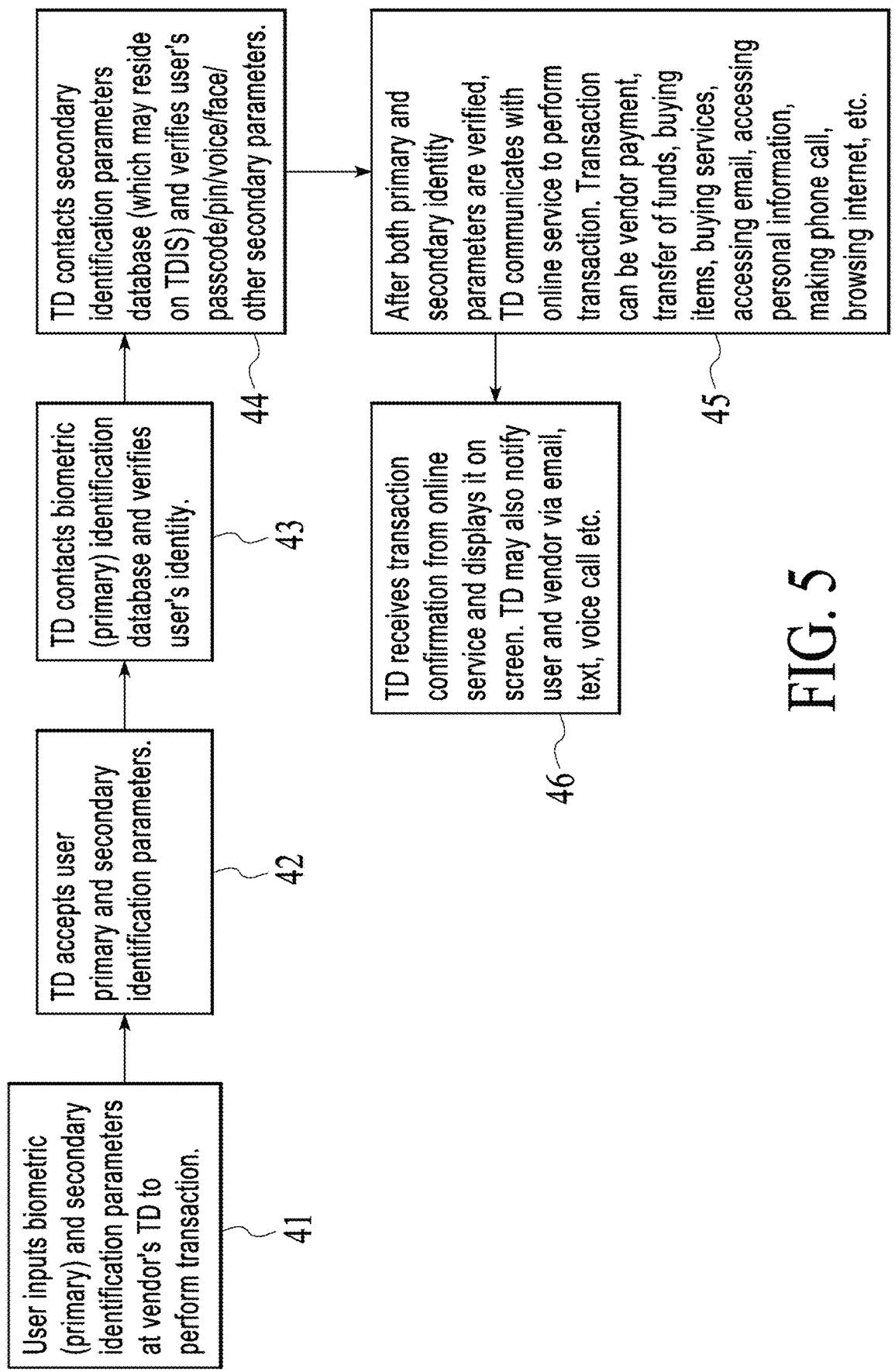
FIG. 5 is a simplified flow chart for a transaction device in accordance with an implementation.

FIG. 5 is a simplified flow chart for a transaction device within the first example architecture of a transaction device system as shown in FIG. 4. In a block 41, a user inputs biometric (primary) identification parameters and secondary identification parameters a vendor's transaction device in order to perform a transaction. In a block 42, the transaction device accepts the user primary and secondary identification parameters. In a block 43, the transaction device contacts a biometric (primary) identification database and verifies the user's identity. In a block 44, the transaction device contacts a secondary identification parameters database and verifies the user's secondary identification parameters. For example, the secondary identification parameters database can reside on a transaction device interface server (TDIS). Secondary parameters can include, for example, a picture code pin, number pin, alpha numeric password, voice recognition, face recognition, a custom sound provided by a user, a tapping pattern provided by customer, a whistling sound provided by user and so on.

In a block 45, after both primary and secondary identity parameters are verified, the transaction device communicates with an online service to perform the transaction. For example, the transaction can be a vendor payment, a transfer of funds, a purchase of items, a purchase of services, verification of passenger's identity and so on. In a block 46, the transaction device receives confirmation from the online service and displays the confirmation to the user. The transaction device may also notify a user and vendor via email, text, phone call or in some other way.

Figure 6A:
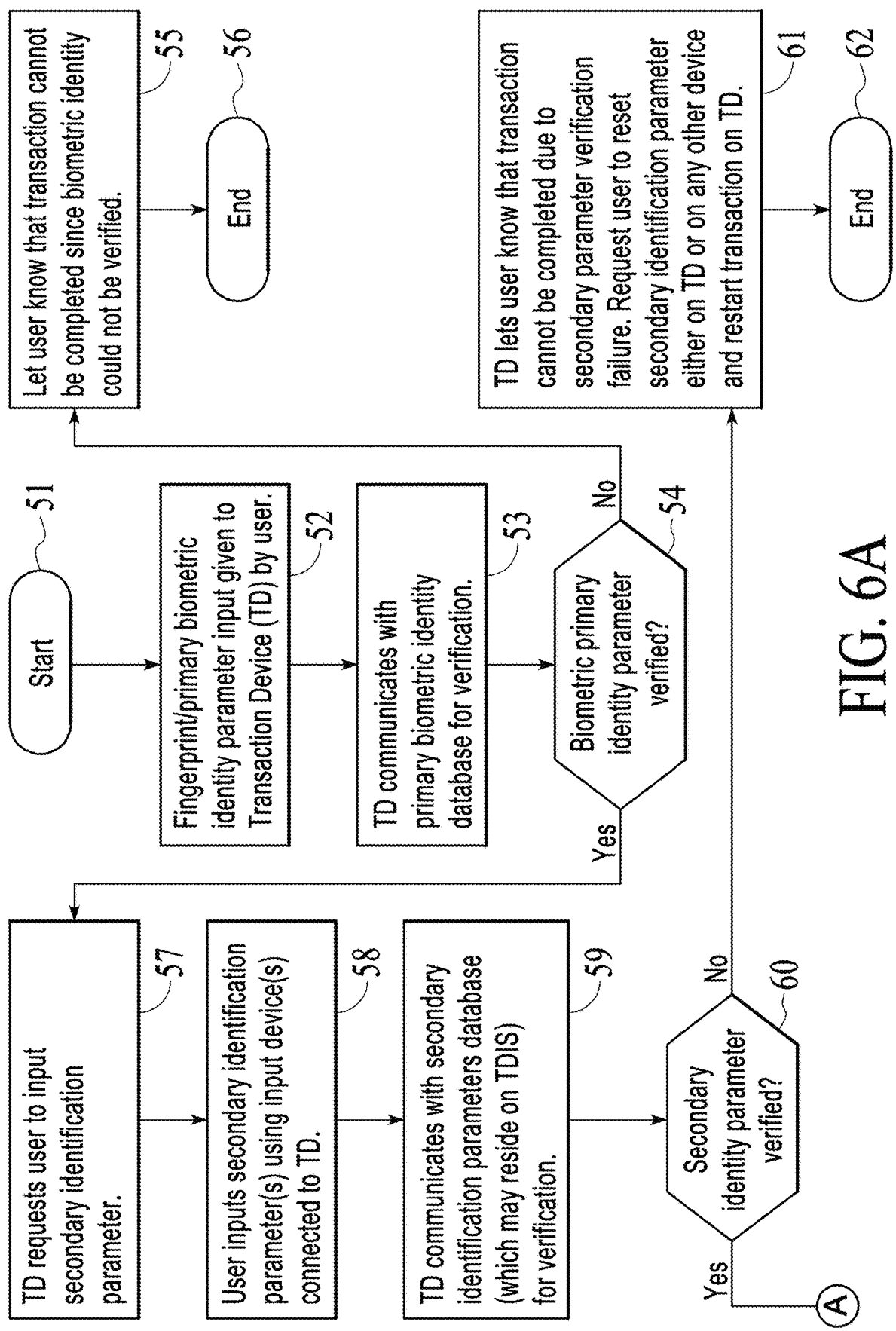
FIG. 6A and FIG. 6B are a more detailed flowchart for a transaction device in accordance with an implementation.
Figure 6B:
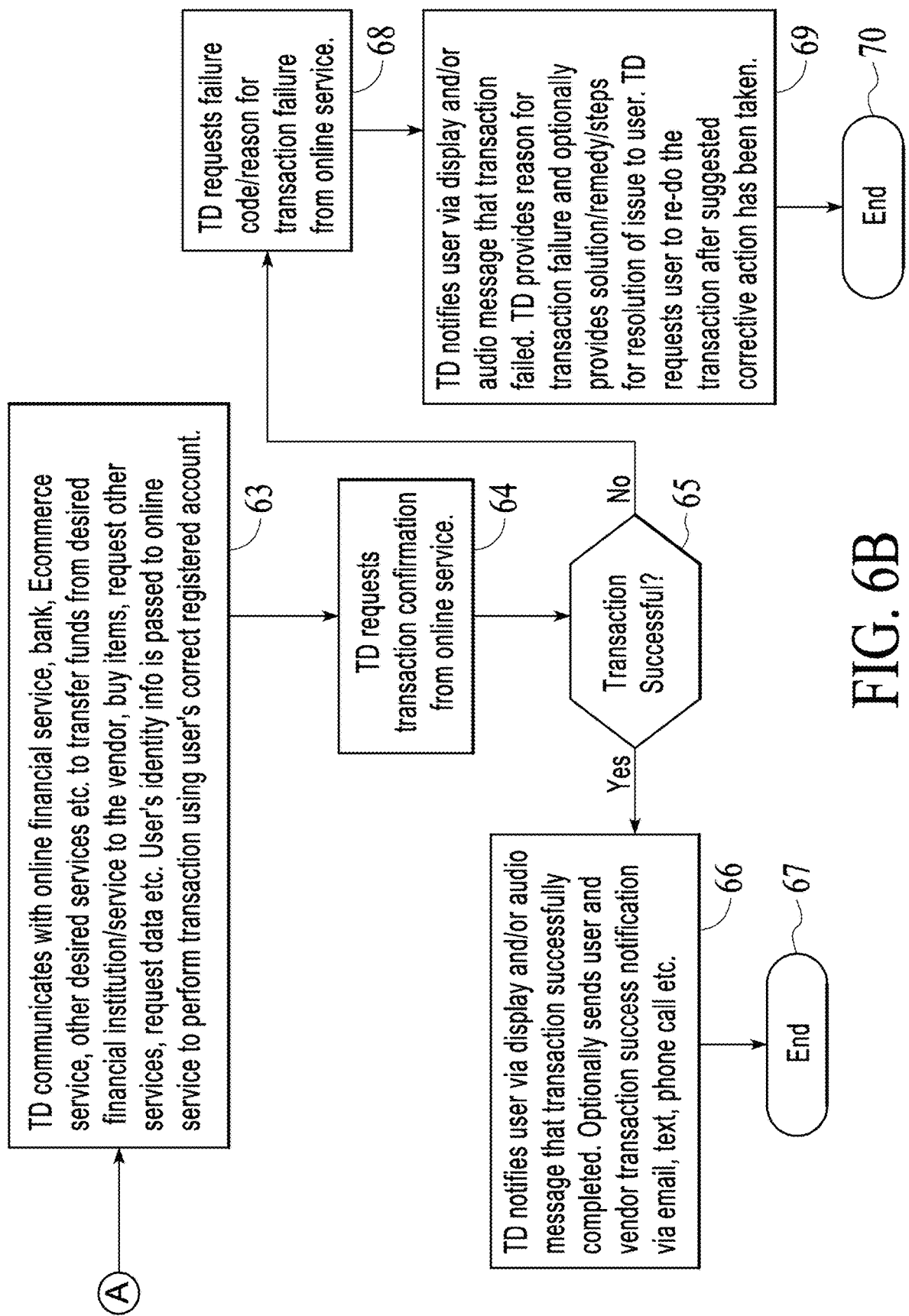

FIG. 6A and FIG. 6B are a more detailed flowchart for a transaction device within the first example architecture of a transaction device system as shown in FIG. 4. The process starts in a block 51. In a block 52, the primary biometric identity parameter is received from the user by the transaction device. In a block 53, the transaction device communicates with the primary biometric identity parameter database for verification. In a block 54, a check is made to verify the biometric primary identity parameter. If the biometric primary identity parameter is not verified, in a block 55, the transaction device notifies the user that the transaction cannot be completed because the biometric identity could not be verified. In a block 56, the process ends.

If the biometric primary identity parameter is verified, in a block 57, the transaction device requests the user to input a secondary identification parameter. In a block 58, the transaction device receives the secondary identification parameter(s) from the user though an input device connected to the transaction device. In a block 59, the transaction device communicates with the secondary identity parameter database for verification. In a block 60, a check is made to verify the secondary identity parameter. If the secondary identity parameter is not verified, in a block 61, the transaction device notifies the user that the transaction cannot be completed because the secondary identity parameter verification failed. The transaction device requests the user to reset the secondary identification parameter either on the transaction device or on another device and to restart the transaction on the transaction device. In a block 62, the process ends.

If the secondary identity parameter is verified, in a block 63, the transaction device requests online service to perform desired transaction. In a block 64 transaction device requests confirmation from the pertinent online service about transaction completion or failure. In a block 65, a check is made to verify the transaction was successful. If the transaction is successful, in a block 66, the transaction device notifies the user, for example, via a display and/or an audio message, that the transaction was successfully completed. Optionally, the transaction device can alternatively or in addition send the user and the vendor a transaction success notification via email, text, phone call, or in some other way. In a block 67, the process is complete.

If the transaction is not successful, in a block 68, the transaction device requests from the online service a failure code or reason for the transaction failure. In a block 69, the transaction device notifies the user, for example, via a display or an audio message, that the transaction was not successfully completed. For example, the transaction device provides reasons for the transaction failure and optionally suggests a solution, remedy or steps for resolution to the user. For example, the transaction device requests the user to repeat the transaction after suggested corrective action has been taken. In a block 70, the process ends.

Figure 7A:
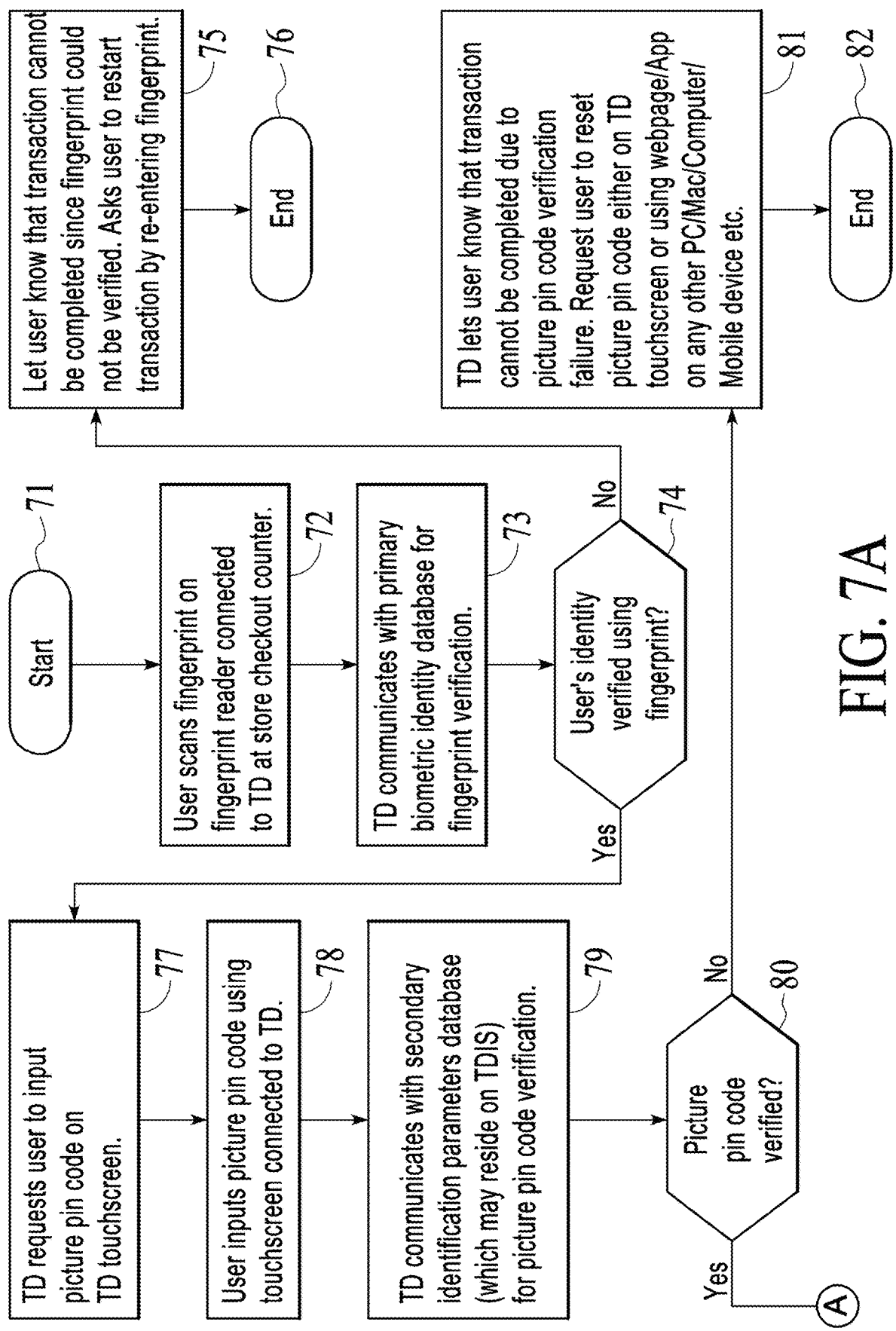
FIG. 7A and FIG. 7B are a flowchart illustrating a payment transaction using a transaction device in accordance with an implementation.
Figure 7B:
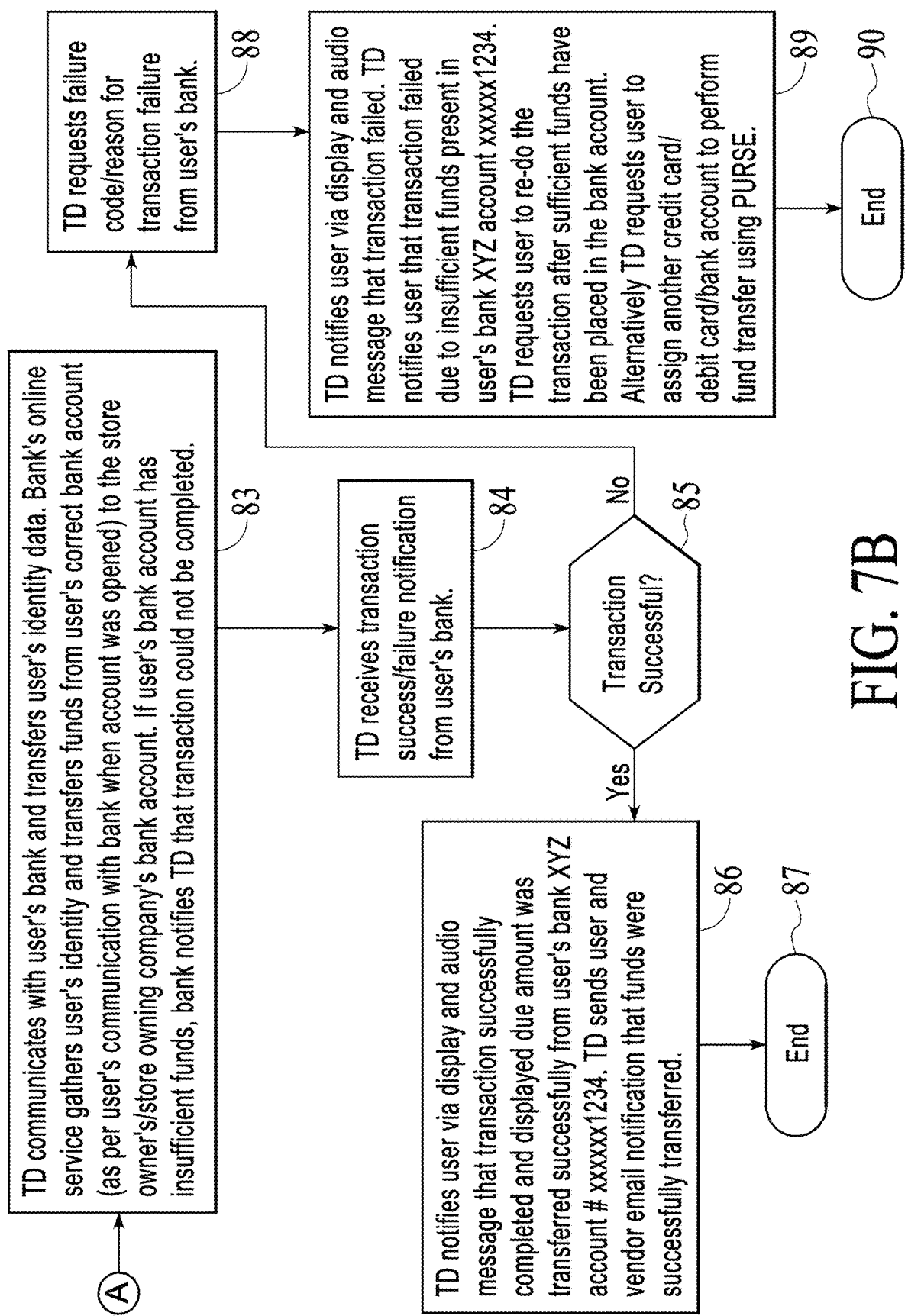

FIG. 7A and FIG. 7B provide an example of a commercial transaction within the first example architecture of a transaction device system as shown in FIG. 4 where a payment is made in a department store. The process starts in a block 71. In a block 72, a fingerprint is received from the user by a fingerprint reader connected to the transaction device. In a block 73, the transaction device communicates with the primary biometric identity parameter database to verify the received fingerprint. In a block 74, a check is made to verify the received fingerprint. If the fingerprint is not verified, in a block 75, the transaction device notifies the user that the transaction cannot be completed because the fingerprint could not be verified. In a block 76, the process ends.

If the fingerprint is verified, in a block 77, the transaction device requests the user to input a picture pin code on a touchscreen of the transaction device. In a block 78, the transaction device receives the picture pin code from the user though the touchscreen of the transaction device. In a block 79, the transaction device communicates with the secondary identity parameter database for verification of the picture pin code. In a block 80, a check is made to verify the secondary identity parameter. If the secondary identity parameter is not verified, in a block 81, the transaction device notifies the user that the transaction cannot be completed because the picture pin code verification failed. The transaction device requests the user to reset the picture pin code either on the transaction device touchscreen or using a webpage, app or other device and to restart the transaction on the transaction device. In a block 82, the process ends.

If the picture pin code is verified, in a block 83, the transaction device transfers the user's identity to a bank. The bank's online service gathers the user's identity and transfers funds from the user's correct bank account. The correct bank account is determined as per the user's communication with the bank when the account was opened. The funds are sent to the store's bank account. If the user's bank account has insufficient funds, the bank notifies the transaction device that the transaction cannot be completed. In a block 84, the transaction device receives a transaction success or a transaction failure notification from the user's bank. In a block 85, a check is made to verify the transaction was successful. If the transaction is successful, in a block 86, the transaction device notifies the user, for example, via a display and/or an audio message, that the transaction was successfully completed. The amount transferred from the user's bank account is displayed as well as abridged account information to identify the account to the user. The transaction device sends the user and the vendor a transaction success notification via email, text, phone call, or in some other way. In a block 87, the process is complete.

If the transaction is not successful, in a block 88, the transaction device requests from the bank a failure code or reason for the transaction failure. In a block 89, the transaction device notifies the user, via a display and/or an audio message, that the transaction was not successfully completed because of insufficient funds. The transaction device suggests the user can repeat the transaction after additional funds have been deposited into the account. Alternatively, the transaction device invites the user to try again with using another bank account, credit card or debit card. In a block 90, the process ends. For example, the transaction is for a purchase of goods or services. Alternatively, the transaction is to allow a user access to personal information, access to initiate communication or access to obtain personalized internet access.

Figure 8:
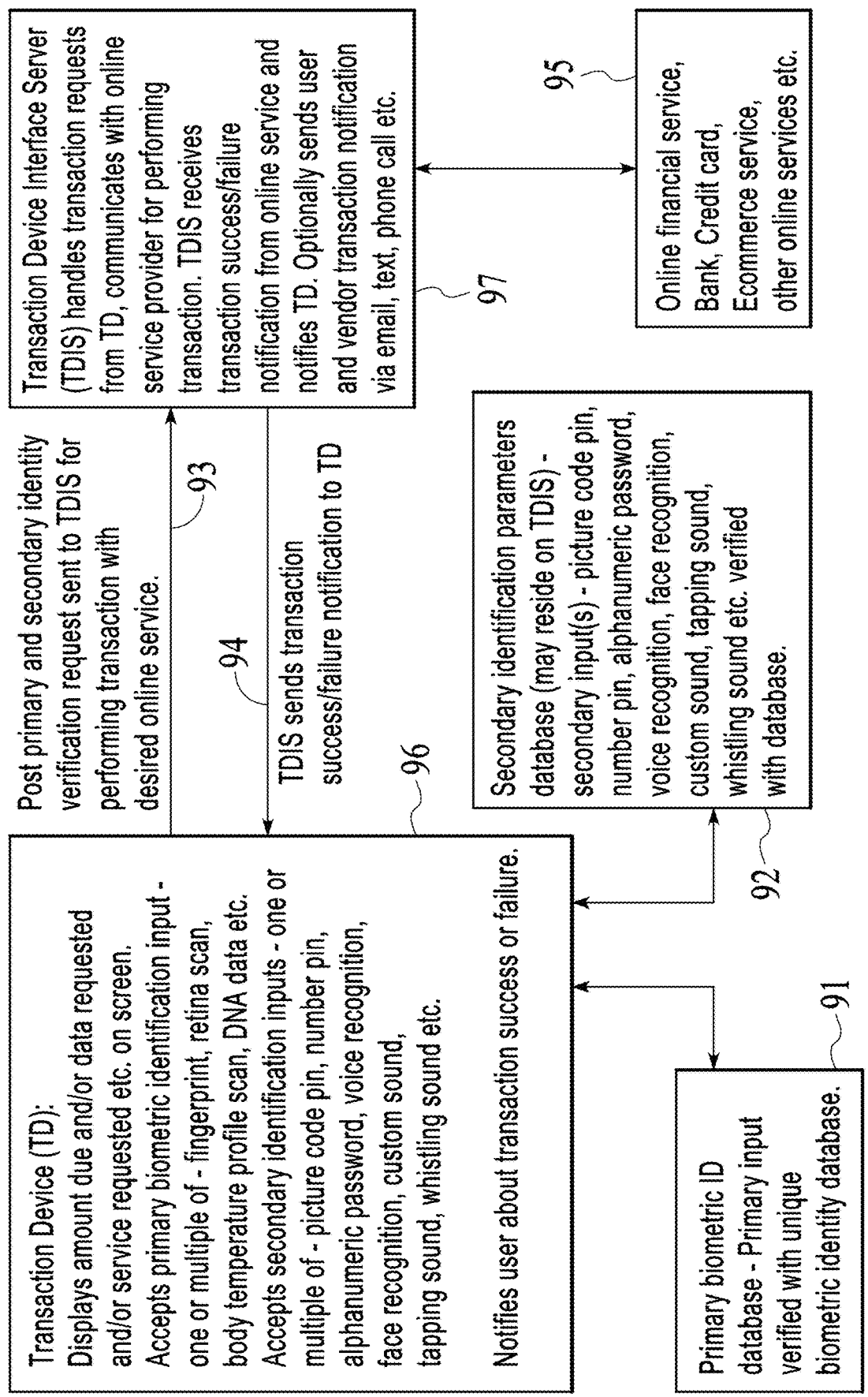
FIG. 8 is a simplified diagram showing architecture of a transaction device in accordance with an alternative implementation.

FIG. 8 is a simplified diagram showing a second example architecture of a transaction device system that includes a transaction device 96. For example, transaction device 96 displays an amount due and/or data requested and/or service(s) requested and/or other information on a display screen. Transaction device 96 accepts primary biometric identification. For example, primary biometric identification can be one or more of fingerprint, retina scan, body temperature profile scan, DNA data, and so one. Transaction device 96 also accepts secondary identification inputs. For example, secondary identification inputs can include a picture code pin, number pin, alpha numeric password, voice recognition, face recognition, a custom sound provided by a user, a tapping pattern provided by customer, a whistling sound provided by user, RFID tag scan and so on. Transaction device 96 notifies a user about transaction success or failure. Optionally, transaction device 96 sends a user and vendor transaction notification, for example, via email, text, phone call and so on.

A primary biometric identification parameters database 91 provides verification for primary biometric identification obtained from the user by comparing the primary biometric identification obtained from the user with information stored in primary biometric identification parameters database 91.

A secondary identification parameters database 92 provides verification for secondary identification parameters obtained from the user by comparing secondary identification parameters obtained from the user with information stored in secondary identification parameters database 92. Secondary parameters can include, for example, a picture code pin, number pin, alpha numeric password, voice recognition, face recognition, a custom sound provided by a user, a tapping pattern provided by customer, a whistling sound provided by user, RFID tag scan and so on. Secondary identification parameters database 92 may reside on a transaction device interface server (TDIS) 97.

An arrow 93 represents post primary and secondary identity verification request sent to TDIS 97 for performing a transaction. TDIS 97 handles transaction requests from transaction device 96, communicates with an online service provider 95 for performing transactions. TDIS 97 receives transaction success or failure notifications from online service 95 and notifies transaction device 96. Arrow 94 represents TDIS 97 sending a transaction success or failure notification to transaction device 96. Optionally, TDIS 97 sends user and vendor transaction notifications via email, text, phone call or in some other way. Online service 95 is, for example, an online financial service, a bank, a credit card processor, an ecommerce service, airport security service or another type of provider of online services.

Figure 9:
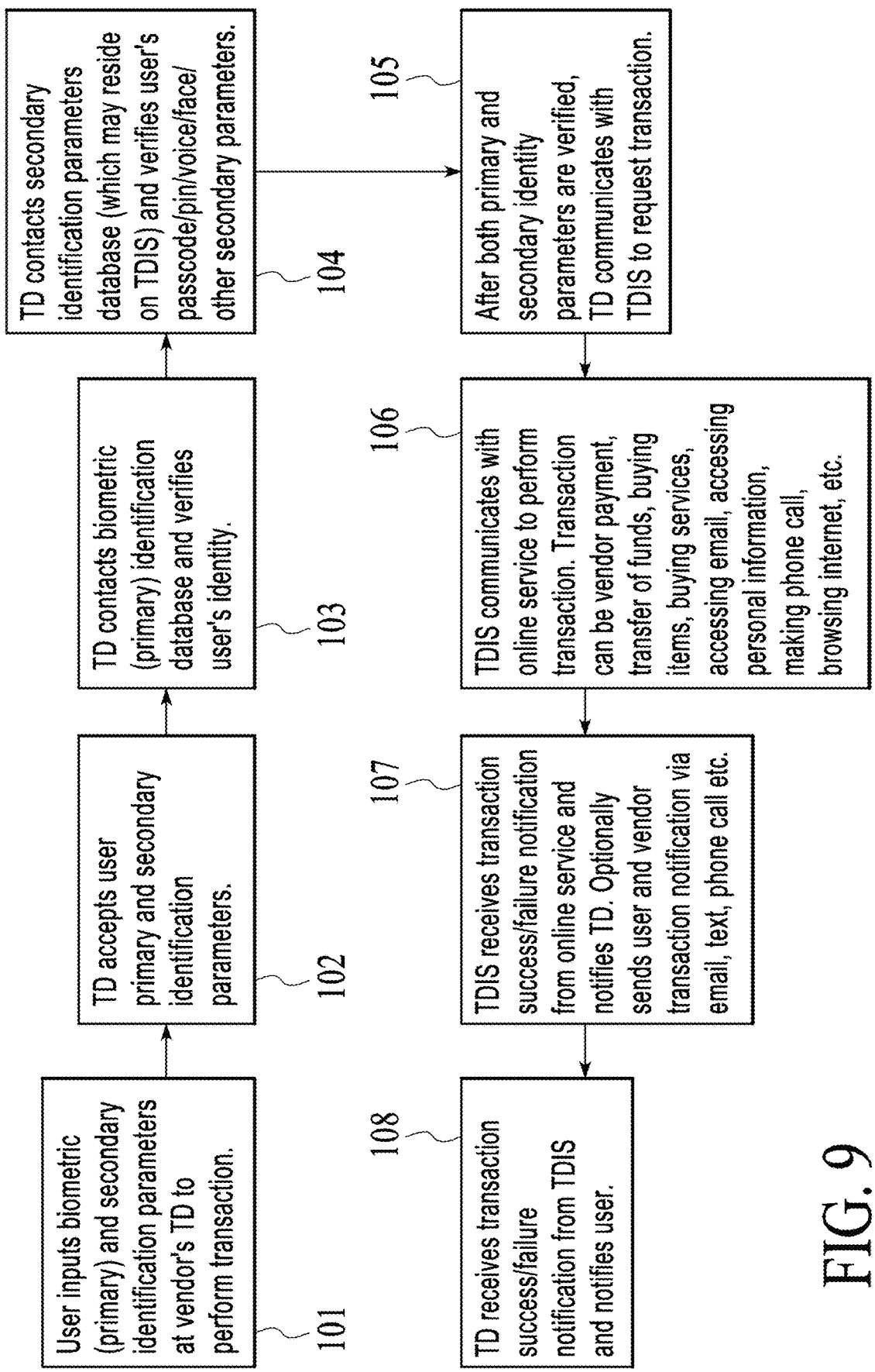
FIG. 9 is a simplified flow chart for a transaction device in accordance with an alternative implementation.

FIG. 9 is a simplified flow chart for a transaction device within the second example architecture of a transaction device system as shown in FIG. 8. In a block 101, a user inputs biometric (primary) identification parameters and secondary identification parameters a vendor's transaction device in order to perform a transaction. In a block 102, the transaction device accepts the user primary and secondary identification parameters. In a block 103, the transaction device contacts a biometric (primary) identification database and verifies the user's identity. In a block 104, the transaction device contacts a secondary identification parameters database and verifies the user's secondary identification parameters. For example, the secondary identification parameters database can reside on a transaction device interface server. Secondary parameters can include, for example, a picture code pin, number pin, alpha numeric password, voice recognition, face recognition, a custom sound provided by a user, a tapping pattern provided by customer, a whistling sound provided by user, RFID tag scan and so on.

In a block 105, after both primary and secondary identity parameters are verified, the transaction device communicates with a TDIS to request a transaction. In a block 106, the TDIS communicates with an online service to perform the transaction. For example, the transaction can be a vendor payment, a transfer of funds, a purchase of items, a purchase of services, verification of a passenger's passport/identity/ticket and so on. In a block 107, the TDIS receives a success notification or a failure notification from the online service and notifies the transaction device. The TDIS may also notify a user and vendor via email, text, phone call or in some other way. In a block 108, the transaction device receives the success notification or the failure notification from the TDIS and notifies the user.

Figure 10A:
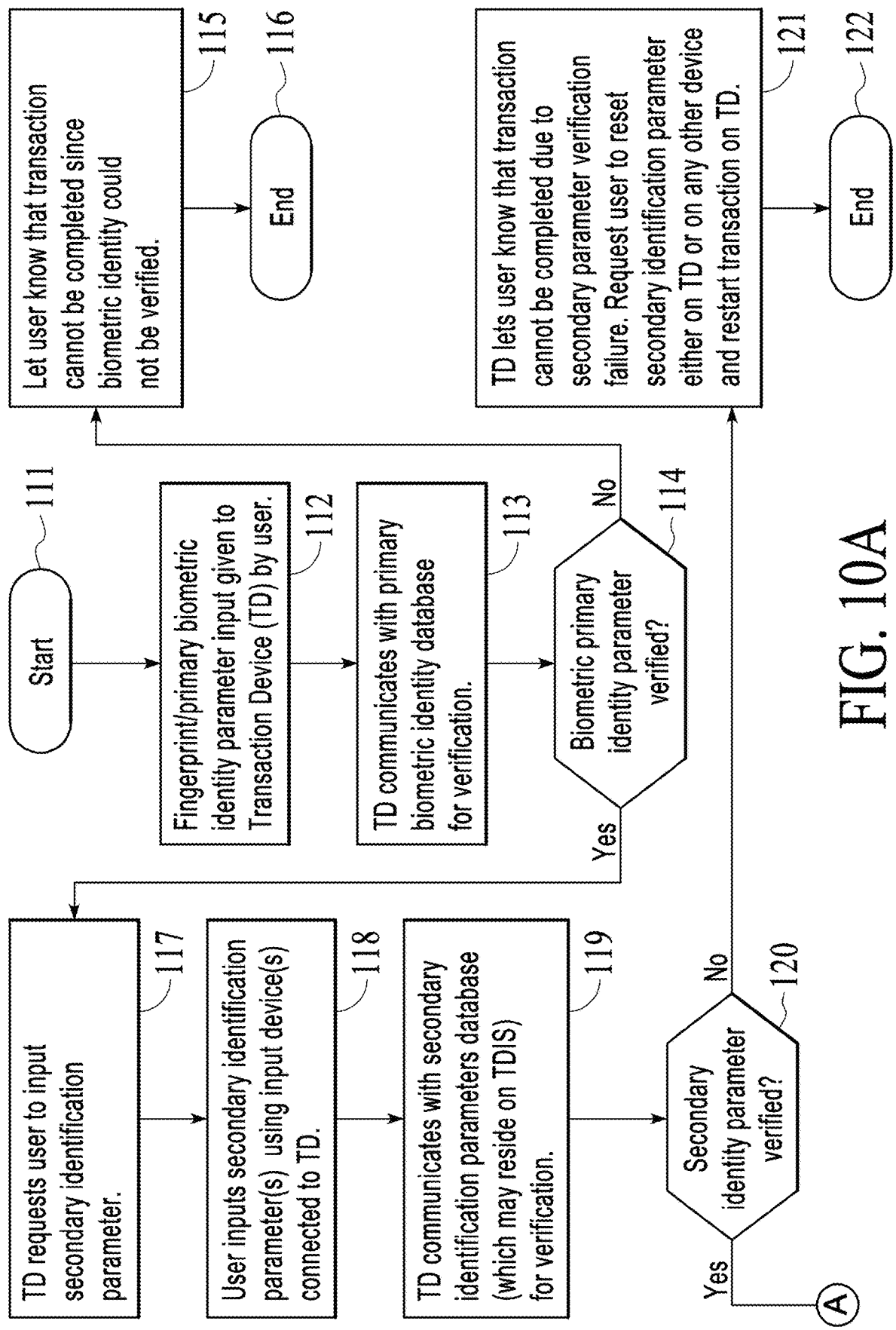
FIG. 10A and FIG. 10B are a more detailed flowchart for a transaction device in accordance with an alternative implementation.
Figure 10B:
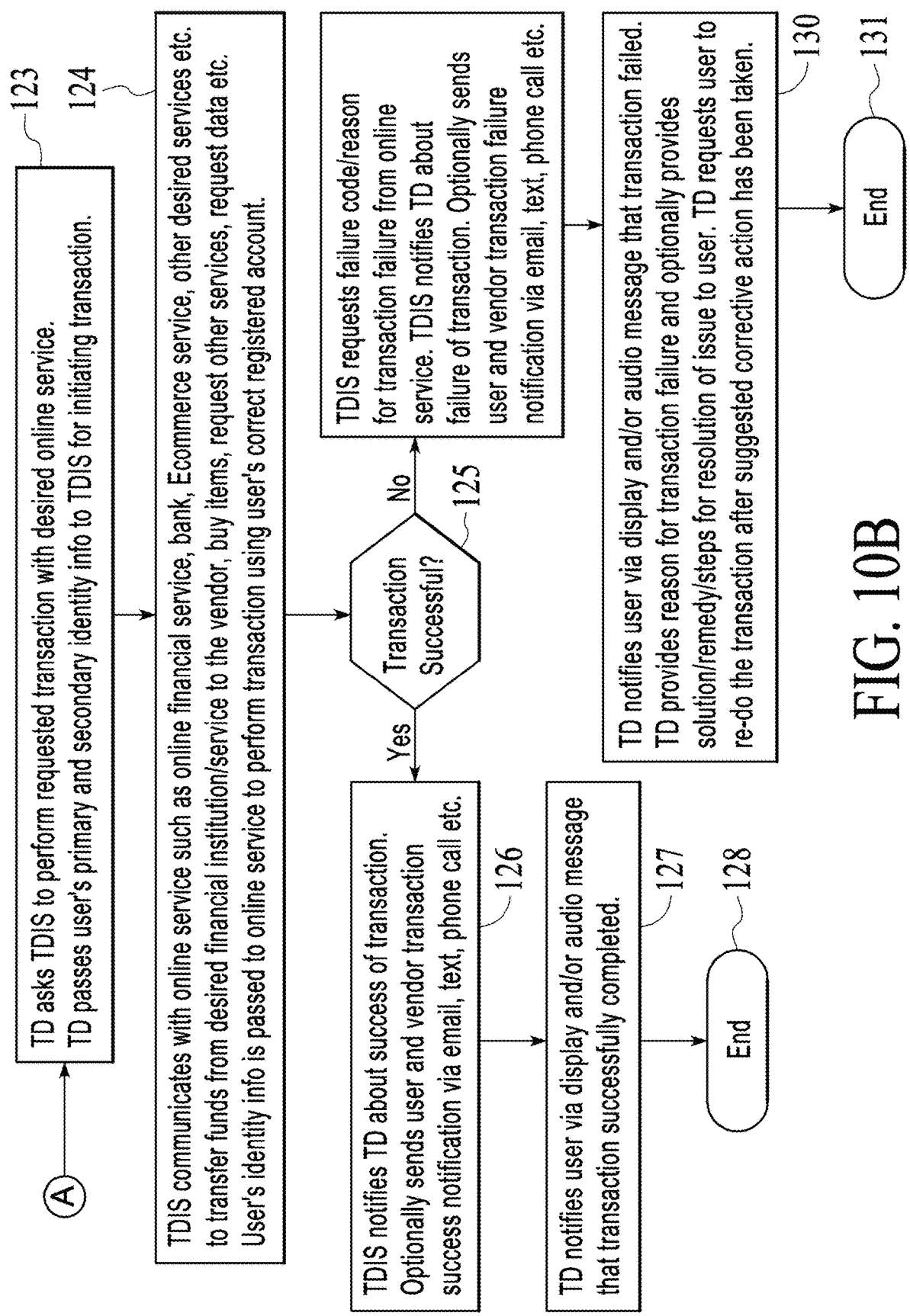

FIG. 10A and FIG. 10B are a more detailed flowchart for a transaction device within the second example architecture of a transaction device system as shown in FIG. 8. The process starts in a block 111. In a block 112, the primary biometric identity parameter is received from the user by the transaction device. In a block 113, the transaction device communicates with the primary biometric identity parameter database for verification. In a block 114, a check is made to verify the biometric primary identity parameter. If the biometric primary identity parameter is not verified, in a block 115, the transaction device notifies the user that the transaction cannot be completed because the biometric identity could not be verified. In a block 116, the process ends.

If the biometric primary identity parameter is verified, in a block 117, the transaction device requests the user to input a secondary identification parameter. In a block 118, the transaction device receives the secondary identification parameter(s) from the user though an input device connected to the transaction device. In a block 119, the transaction device communicates with the secondary identity parameter database for verification. In a block 120, a check is made to verify the secondary identity parameter. If the secondary identity parameter is not verified, in a block 121, the transaction device notifies the user that the transaction cannot be completed because the secondary identity parameter verification failed. The transaction device requests the user to reset the secondary identification parameter either on the transaction device or on another device, mobile phone, tablet, person computer and to restart the transaction on the transaction device. In a block 122, the process ends.

If the secondary identity parameter is verified, in a block 123, the transaction device asks the TDIS to perform with requested transaction with the desired online service. The transaction device passes to the TDIS the user's primary and secondary identification information for initiating the transaction. The TDIS communicates with the online service to perform the requested transaction. For example, the online service is an online financial service, a bank, an ecommerce service, airport security service or some other type of online service. For example, the transaction is to transfer funds from an online service to a vendor, buy items, to request other services, to request data, verify a passenger's identity/passport/ticket information or some other task. The user's identity information is passed to the online service to perform the transaction using the user's correct registered account.

In a block 125, a check is made to verify the transaction was successful. If the transaction is successful, in a block 126, the TDIS notifies the transaction device of the successful transaction. Optionally, the TDIS can send the user and the vendor a transaction success notification via email, text, phone call, or in some other way. In a block 127, the transaction device notifies the user, for example, via a display and/or an audio message, that the transaction was successfully completed. In a block 128, the process is complete.

If the transaction is not successful, in a block 129, the TDIS requests from the online service a failure code or reason for the transaction failure. The TDIS notifies the transaction device of the failed transaction. Optionally, TDIS can send the user and the vendor a transaction failure notification via email, text, phone call, or in some other way. In a block 130, the transaction device notifies the user, for example, via a display and/or an audio message, that the transaction was not successfully completed. For example, the transaction device provides reasons for the transaction failure and optionally suggests a solution, remedy or steps for issue resolution to the user. For example, the transaction device requests the user to repeat the transaction after suggested corrective action has been taken. In a block 131, the process ends.

Figure 11A:
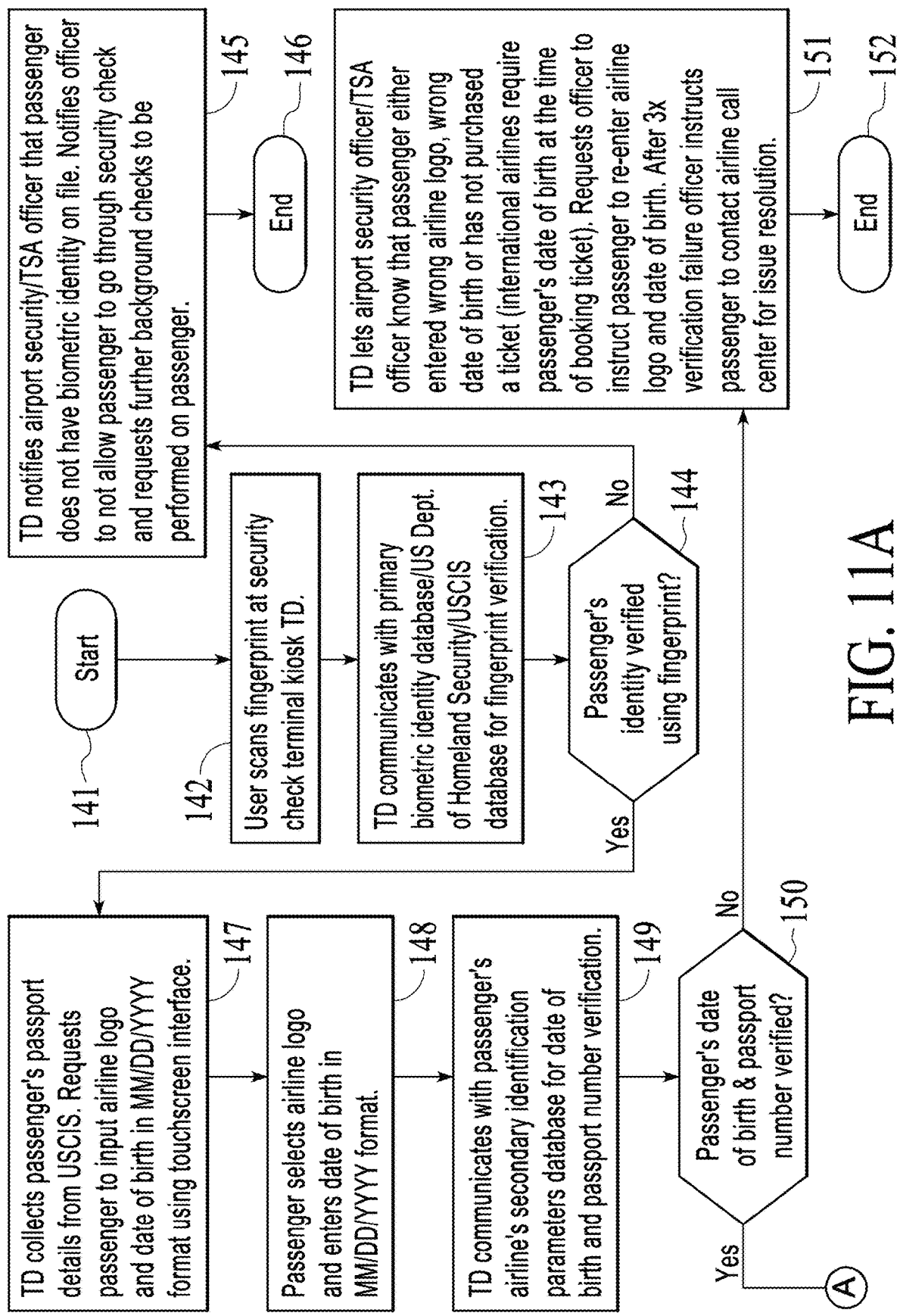
FIG. 11A and FIG. 11B are a flowchart illustrating a payment transaction using a transaction device in accordance with an alternative implementation.
Figure 11B:
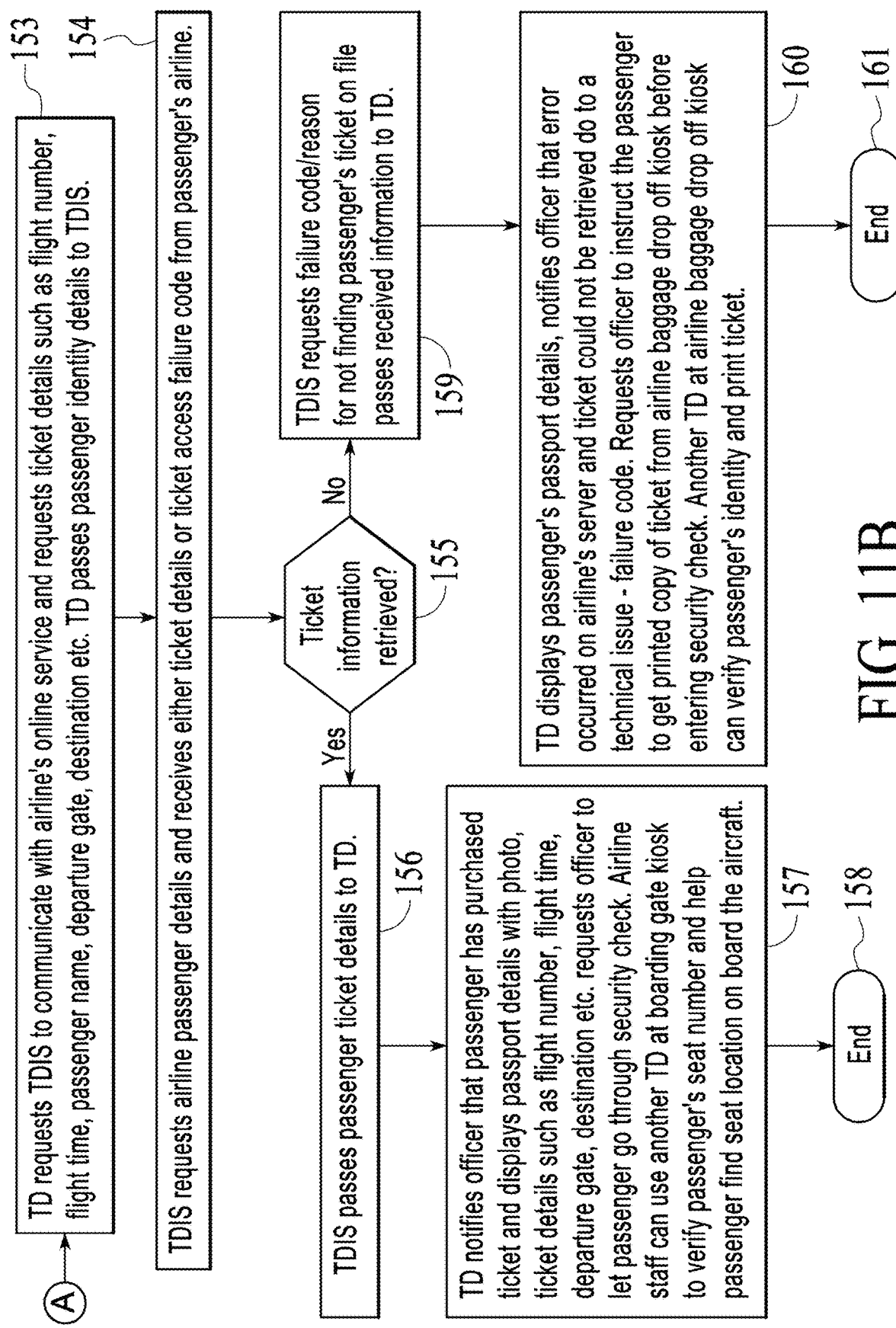

FIG. 11A and FIG. 11B illustrate an example commercial transaction performed within the second example architecture of a transaction device system as shown in FIG. 8 where a passenger catches an international flight without carrying a passport, phone, tablet, personal computer or ticket. The process starts in a block 141. In a block 142, a scan of the passenger's fingerprints is received from the user by the transaction device. In a block 143, the transaction device communicates with the primary biometric identity parameter database for verification. For example, the primary biometric identity parameter database is a USCIS data based for print identification that is monitored by the US Department of Homeland Security. In a block 144, a check is made to determine if the fingerprints were verified. If the fingerprints are not verified, in a block 145, the transaction device notifies the airport security or a TSA officer that the passenger does not have a biometric identity on file. The passenger is not allowed to go through a security check and request further background checks to be performed on the passenger. In a block 146, the process ends.

If the fingerprints are verified, in a block 147, the transaction device collects the passenger's passport details from either the USCIS or from passport issuing authority of the passenger's home country. The transaction device requests the passenger to input airline logo and date of birth in a MM/DD/YYYY format. In a block 148, the transaction device receives the secondary identification parameter(s) from the user though an input device connected to the transaction device. In a block 149, the transaction device communicates with the passenger's airline's secondary identity parameter database for date of birth and passport number verification. In a block 150, a check is made to verify the date of birth and passport number verification. If the date of birth and passport number verification is not verified by the passenger's airline's secondary identity parameter database, in a block 151, the transaction device notifies the airport security officer or TSA officer that the passenger either entered a wrong airline logo, wrong date of birth or has not purchased a ticket. International airlines require a passenger's date of birth at the time of ticket booking. The transaction device requests the office to instruct the passenger to re-enter airline logo and date of birth. If verification fails three times, the officer instructs the passenger to contact airline call center for issue resolution. In a block 152, the process ends.

If the secondary identity parameter is verified, in a block 153, the transaction device requests the TDIS to communicate the with the airline's online service and request ticket details such as flight number, flight time, passenger name, departure gate, destination and so on. The transaction device passes the passenger identity details to the TDIS. In a block 154, the TDIS requests airline passenger details and receives either ticket details or ticket access failure code from the passenger's airline.

In a block 155, a check is made to verify the ticket information was retrieved. If the transaction is successful, in a block 156, the TDIS passes the passenger ticket details to the transaction device. In a block 157, the transaction device notifies the officer that the passenger has purchased a ticket and displays passport details with a photo, ticket details such as flight number, flight time, departure gate, destination and so on. The transaction device request the officer to let the passenger go through the security check. Airline staff can use another transaction device at a boarding gate kiosk to verify the passenger's seat number and help the passenger find the seat location on board the aircraft. In a block 158, the process is complete.

If the transaction is not successful, in a block 159, the TDIS requests from the online service a failure code or reason for not fining the passenger ticket information of file. The TDIS passes the received information to the transaction device.

In a block 160, the transaction device displays passenger passport details, photo and notifies officer that error occurred on the airline' server and ticket could not be retrieved due to a technical issue or ticket reservation failure or because passenger did not purchase a ticket. The transaction device requests the officer to instruct the passenger to either buy a ticket or get a printed copy of the ticket from the airline baggage drop off kiosk before entering security check. Another transaction device at airline baggage drop off kiosk can verify the passenger's identity and print the ticket. In a block 161, the process ends.

Figure 12:
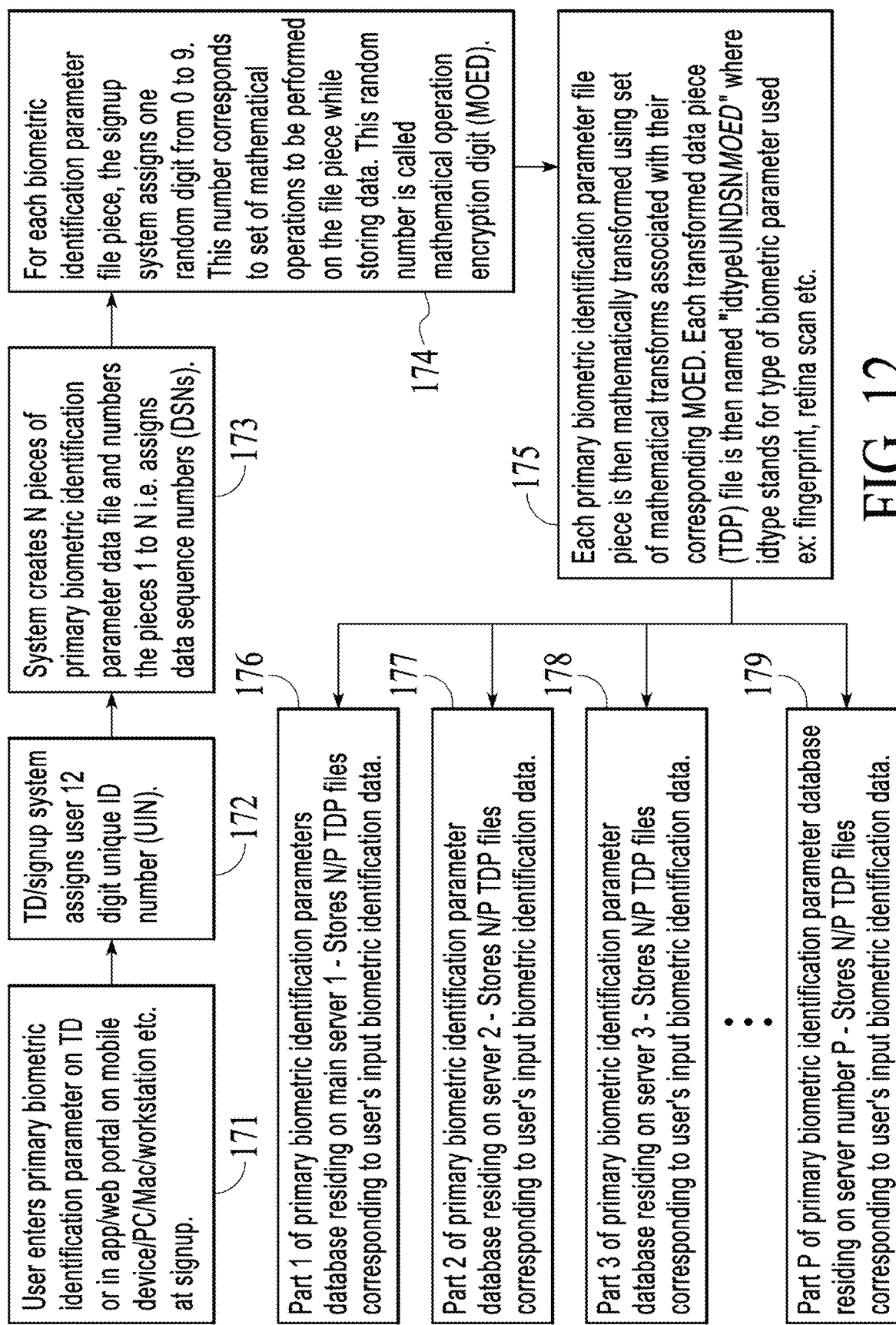
FIG. 12 illustrates identification parameter data storage flow at a new user signup for a transaction device in accordance with an implementation.

FIG. 12 illustrates identification parameter data storage flow at a new user signup for a transaction device. In a block 171, at sign-up, a user enters a primary biometric identification on a TD, an app, or a web portal accessed from a computing device such as a smartphone, tablet computer, laptop computer, desktop computer, work station or some other computing system. In a block 172, the transaction device or web portal or other manifestation of signup system assigns the user a unique identification number (UIN). For example, the UIN is twelve digits. In a block 173, the system fragments user input biometric identification parameter data by breaking up user's primary biometric identification parameter data file into N number of pieces. For example, each file piece receives a data sequence number (DSN) from 1 to "N" where "N" is the number of pieces. In a block 174, for each biometric identification parameter file piece, the signup system assigns one random digit from 0 to 9. This number corresponds to the set of mathematical operations to be performed on the file piece while storing data. This random number is called a mathematical operation encryption digit (MOED), or more generally, to cover cases where there are other than ten sets of mathematical operations, the random number can be called a mathematical operation encryption number (MOEN). In a block 175, each primary biometric identification parameter file piece is then mathematically transformed using set of mathematical transforms associated with their corresponding MOED. Each transformed data piece (TDP) file is then named "idtypeUINDSNMOED" where idtype stands for type of biometric parameter used. For example, the type of biometric parameter used is a fingerprint, a retina scan or some other type of biometric parameter. For example, the same or a similar data storage, encryption, verification and re-encryption procedure applies to secondary identification parameters.

The "N" pieces are stored on "P" servers, where "N" is greater than "P" and where each server stores N/P pieces. For example, block 176 represents part one of the primary biometric identification parameter database residing on a first main server that stores N/P TDP files corresponding to the user's input biometric identification data. Block 177 represents part two of the primary biometric identification parameter database residing on a second server that stores N/P TDP files corresponding to the user's input biometric identification data. Block 178 represents part three of the primary biometric identification parameter database residing on a third server that stores N/P TDP files corresponding to the user's input biometric identification data. And so on until block 179 represents part "P" of the primary biometric identification parameter database residing on a "$P^{th}$" server that stores N/P TDP files corresponding to the user's input biometric identification data.

Figure 13A:
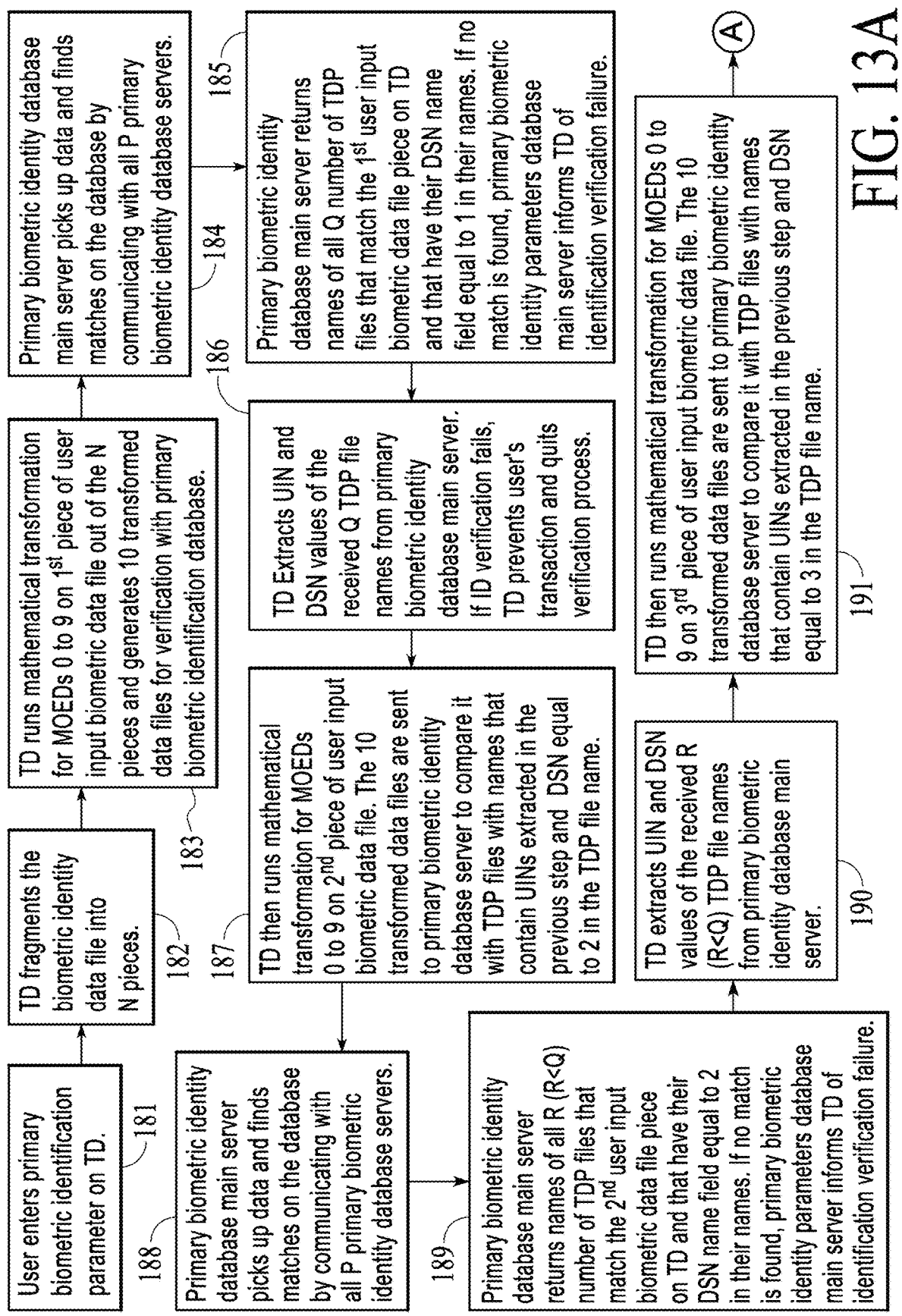
FIG. 13A and FIG. 13B illustrate verification of a user biometric identity during a transaction using a transaction device in accordance with an implementation.
Figure 13B:
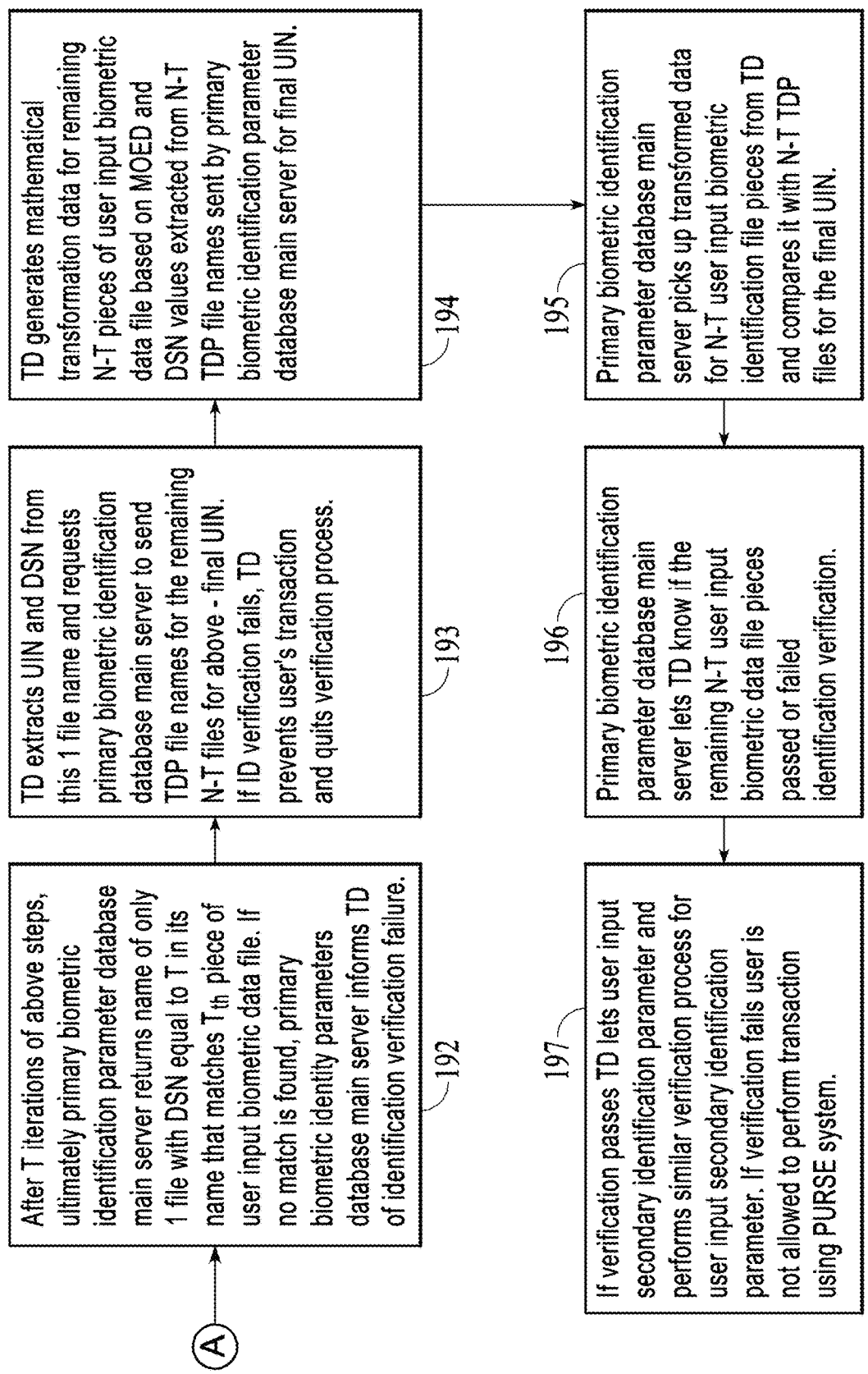

FIG. 13A and FIG. 13B illustrate verification of a user biometric identity during a transaction using a transaction device. In a block 181, a user enters a primary biometric identification parameter on a transaction device. In a block 182, the transaction device fragments the biometric identity data file into "N" pieces. In a block 183, the transaction device runs mathematical transformation for MOEDs 0 to 9 on a first piece of user input biometric data file out of the N pieces and generates 10 transformed data files for verification with the biometric identification parameters database. In a block 184, the primary biometric identity database main server picks up data and finds matches on the database by communication with all "P" primary biometric identity database servers. In a block 185, the primary biometric identity database main server return as names of all "Q" number of TDP files that match the first user input biometric data file piece on the transaction device and that have their DSN name field equal to 1 in their names. If no match is found, the TDIS informs the transaction device of the identification failure.

In a block 186, the transaction device extracts the UIN and the DSN values of the received Q TDP file names from the primary biometric identity database main server. If identification verification fails, the transaction device prevents the user's transaction and quits the verification process. In a block 187, the transaction device runs a mathematical transformation for MOEDs 0 to 9 on a second piece of user input biometric data file. The resulting ten transformed data files are sent to the primary biometric identity database server to compare with TDP files with names that contain UINs extracted in block 186 and where DSN is equal to two in the TDP file name. In a block 188, the primary biometric identity database main server picks up data and finds matches on the database by communicating with all P primary biometric identity database servers. In a block 189, the primary biometric identity database main server returns names of all R (where R is less than Q) number of TDP files that match the second user input biometric data file piece on the transaction device and that have their DSN name field equal to two in their names. If no match is found, the TDIS informs the transaction device of an identification verification failure. In a block 190, the transaction device extracts the UIN and the DSN values of the received R TDP file names from the primary biometric identity database main server. In a block 191, the transaction device runs mathematical transformation of MOEDs 0 to 9 on third piece of user input biometric data file. The ten transformed data files are sent to primary biometric identity database server to compare with TDP files with names that contain UINs extracted in the previous step and DSN equal to three in the TDP file name.

In a block 192, after T iterations of the above blocks, ultimately primary biometric identification parameter database main server returns a name of only one file with a DSN equal to T in its name that matches the T$^{th}$ piece of user input biometric data file. If no match is found, the TDIS informs the transaction device of identification verification failure. In a block 193, the transaction device extracts the UIN and the DSN from the one file with DSN equal to T and requests the primary biometric identification parameters database main server to send TDP file names for the remaining N-T files for the above, final UIN. If ID verification fails, the transaction device prevents the user's transaction and quits the verification process. In a block 194, the transaction device generates mathematical transformation data for the remaining (N minus T) pieces of user input biometric data file based on MOED and DSN values extracted from (N minus T) TDP file names sent by primary biometric identification parameter database main server for final UIN. In a block 195, the primary biometric identification parameter database main server picks up transformed data for (N minus T) user input biometric identification file pieces from transaction device and compares the picked up transformed data with (N minus T) TDP files for the final UIN. In a block 196, the primary biometric identification parameter database main server lets the transaction device know if the remaining (N minus T) user input biometric data file pieces passed or failed identification verification. In a block 197, if the verification passes, the transaction device lets the user input secondary identification parameter and performs a similar verification process for the user input secondary identification parameter. If verification fails, the user is not allowed to perform the transaction using the system.

Figure 14:
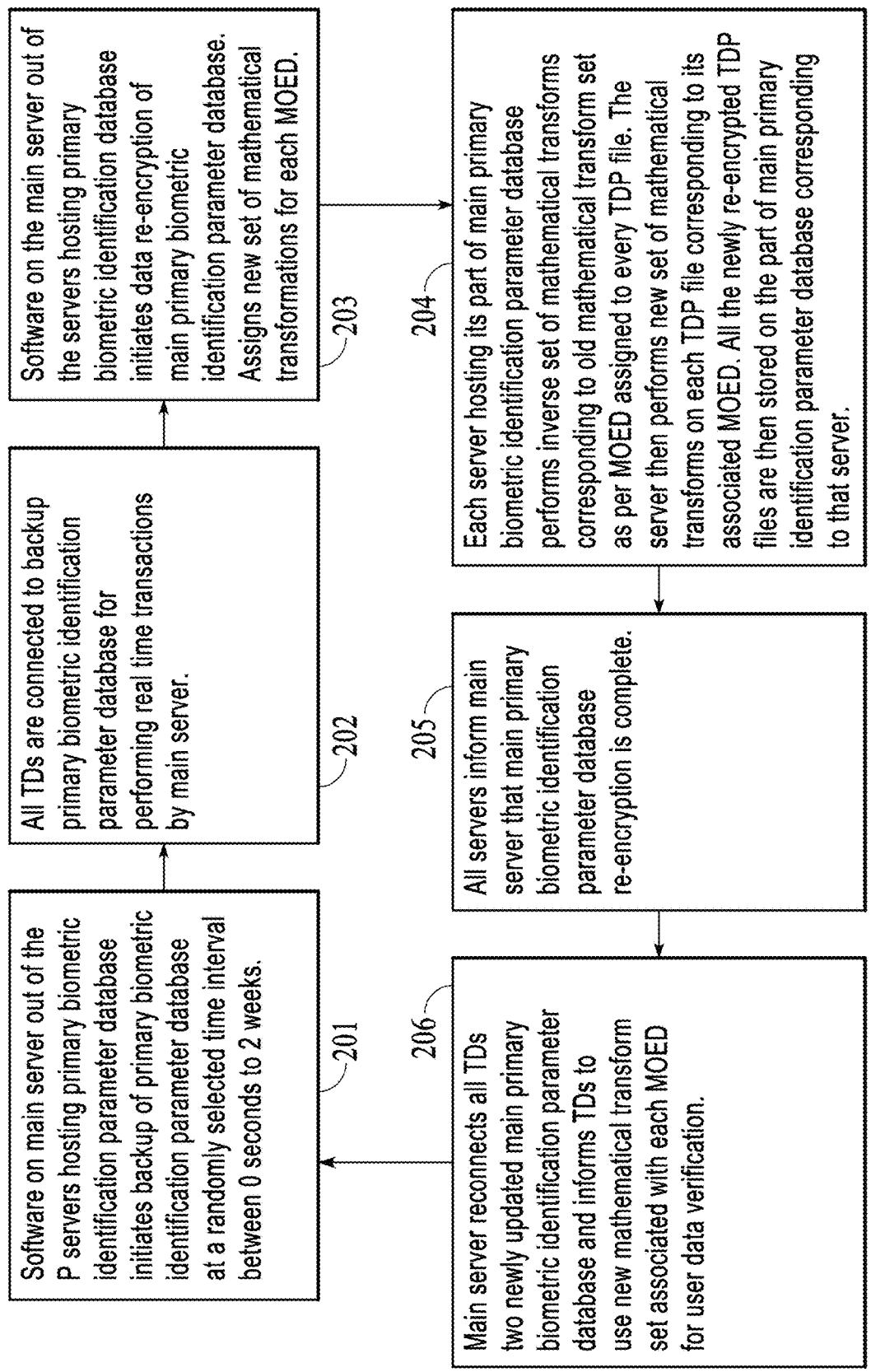
FIG. 14 illustrates re-encrypting of an identification parameter database for a transaction device in accordance with an implementation.

FIG. 14 illustrates re-encrypting of an identification parameter database for a transaction device. In a block 201, software on a main server out of P servers hosting primary biometric identification parameter database initiates backup of the primary biometric identification parameter database at a randomly selected time interval. For example, the randomly selected time interval is between zero seconds and two weeks. In a block 202, all TDs are connected to backup primary biometric identification parameter database for performing real time transactions by the main server. In a block 203, software on the main server out of the servers hosting primary biometric identification parameters database initiates data re-encryption of the main primary biometric identification parameter database. The software also assigns a new set of mathematical transformations for each MOED. In a block 204, each server hosting part of the main primary biometric identification parameter database performs an inverse set of mathematical transforms corresponding to old mathematical transform set as per the MOED assigned to every TDP file. The server then performs a new set of mathematical transforms on each TDP file corresponding to its associated MOED. All the newly re-encrypted TDP files are then stored on the part of the main primary identification parameter database corresponding of that server. In a block 205, all servers inform the main server that the main primary biometric identification parameter database re-encryption is complete. In a block 206, the main server reconnects all the TDs to the newly updated main primary biometric identification parameter database and informs the TDs to use the new mathematical transform set associated with each MOED for user data verification.

Figure 15:
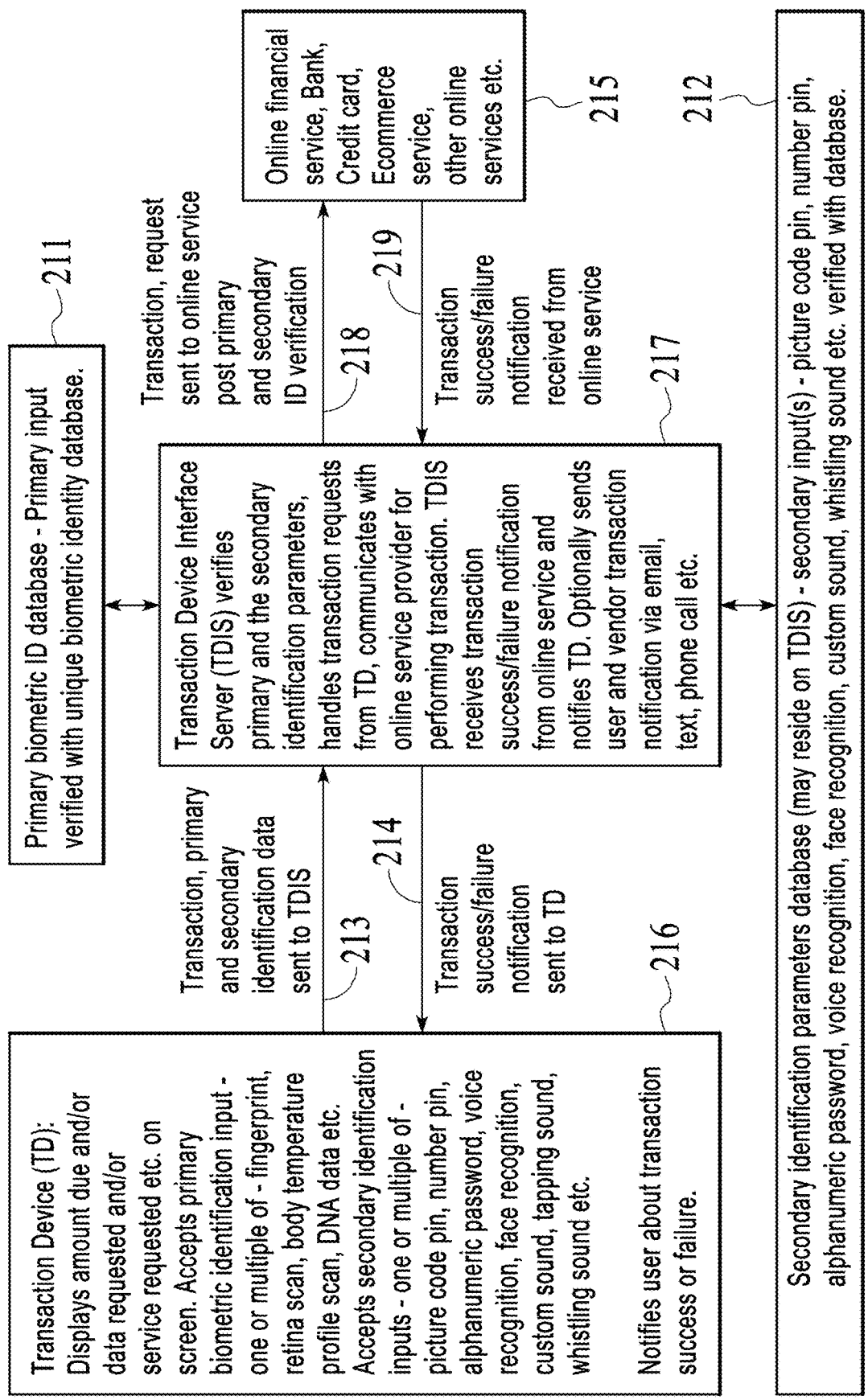
FIG. 15 is a simplified diagram showing architecture of a transaction device in accordance with another alternative implementation.

FIG. 15 is a simplified diagram showing a third example architecture of a transaction device system that includes a transaction device 216. For example, transaction device 216 displays an amount due and/or data requested and/or service(s) requested and/or other information on a display screen. Transaction device 216 accepts primary biometric identification. For example, primary biometric identification can be one or more of fingerprint, retina scan, body temperature profile scan, DNA data, and so one. Transaction device 216 also accepts secondary identification inputs. For example, secondary identification inputs can include a picture code pin, number pin, alpha numeric password, voice recognition, face recognition, a custom sound provided by a user, a tapping pattern provided by customer, a whistling sound provided by user, RFID tag scan and so on. Transaction device 216 notifies a user about transaction success or failure. Optionally, transaction device 216 sends a user and vendor transaction notification, for example, via email, text, phone call and so on.

A primary biometric identification parameters database 211 provides verification for primary biometric identification obtained from the user by comparing the primary biometric identification obtained from the user with information stored in primary biometric identification parameters database 211.

A secondary identification parameters database 212 provides verification for secondary identification parameters obtained from the user by comparing secondary identification parameters obtained from the user with information stored in secondary identification parameters database 212. Secondary parameters can include, for example, a picture code pin, number pin, alpha numeric password, voice recognition, face recognition, a custom sound provided by a user, a tapping pattern provided by customer, a whistling sound provided by user, RFID tag scan and so on. Secondary identification parameters database 212 may reside on a transaction device interface server (TDIS) 217.

An arrow 213 represents primary and secondary identity data and verification request sent to TDIS 217 for performing a transaction. TDIS 17 verifies primary and secondary identification parameters, handles transaction requests from transaction device 216, communicates with an online service provider 215 for performing transactions. TDIS 217 receives transaction success or failure notifications from online service 215 and notifies transaction device 216. Arrow 214 represents TDIS 217 sending a transaction success or failure notification to transaction device 216. Optionally, TDIS 217 sends user and vendor transaction notifications via email, text, phone call or in some other way.

Online service 215 is, for example, an online financial service, a bank, a credit card processor, an ecommerce service, airport security service or another type of provider of online services. An arrow 218 represents transaction requests sent by TDIS 17 to online services 215 for post primary and secondary ID verification. An arrow 219 represents a transaction success or failure notification sent from online service 215 to TDIS 217.

Figure 16:
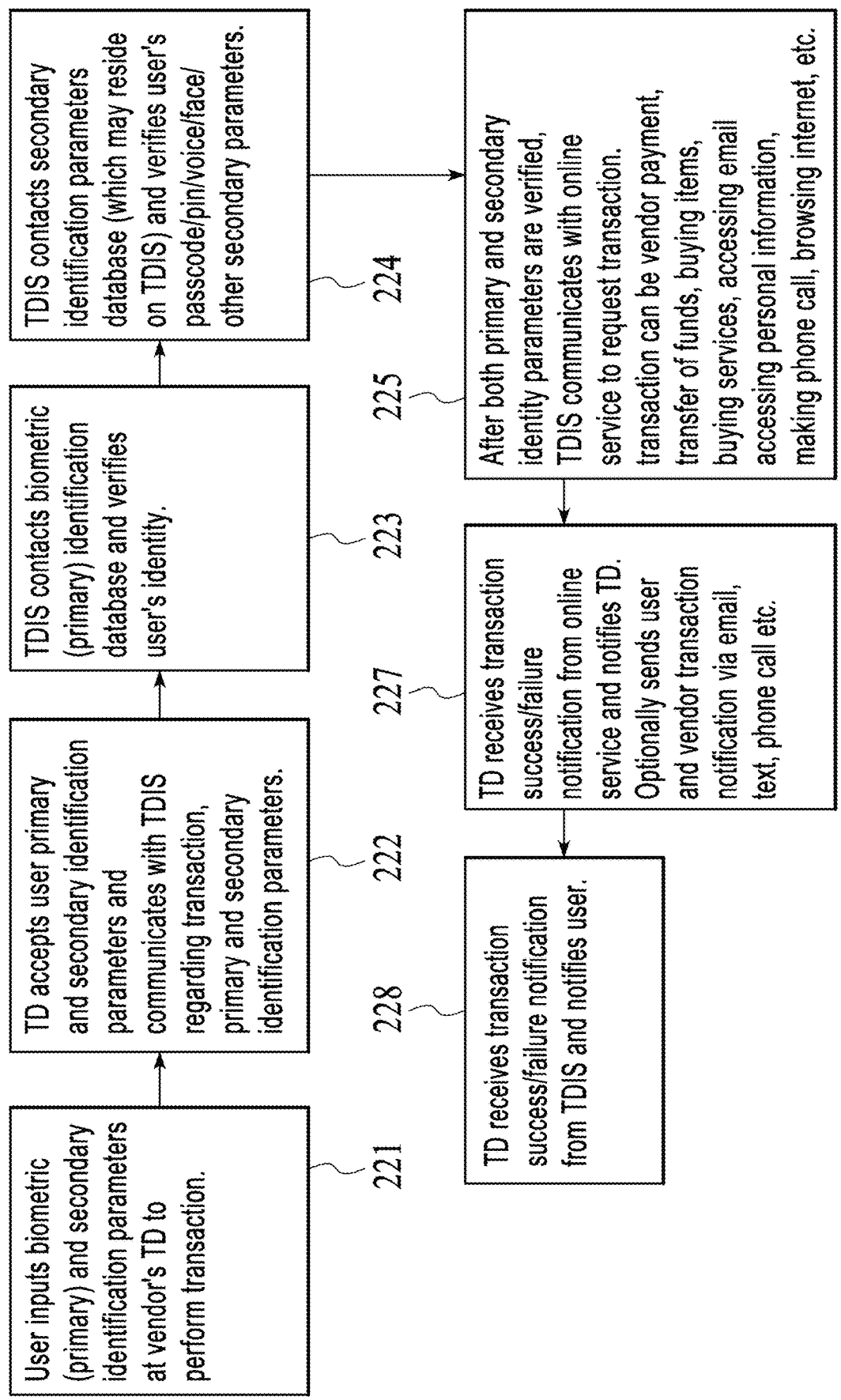
FIG. 16 is a simplified flow chart for a transaction device in accordance with another alternative implementation.

FIG. 16 is a simplified flow chart for a transaction device within the third example architecture of a transaction device system as shown in FIG. 15. In a block 221, a user inputs biometric (primary) identification parameters and secondary identification parameters a vendor's transaction device in order to perform a transaction. In a block 222, the transaction device accepts the user primary and secondary identification parameters. The transaction device communicates with the TDIS regarding the transaction, the primary identification parameters and the secondary identification parameters. In a block 223, the transaction device contacts a biometric (primary) identification database and verifies the user's identity. In a block 224 the transaction device contacts a secondary identification parameters database and verifies the user's secondary identification parameters. For example, the secondary identification parameters database can reside on a transaction device interface server. Secondary parameters can include, for example, a picture code pin, number pin, alpha numeric password, voice recognition, face recognition, a custom sound provided by a user, a tapping pattern provided by customer, a whistling sound provided by user, RFID tag scan and so on.

In a block 225, after both primary and secondary identity parameters are verified, the TDIS communicates with an online service to request a transaction. The transaction can be a vendor payment, a transfer of funds, buying items, buying services, verifying a passenger's identity/passport/ticket or some other type of transaction. In a block 227, the TDIS receives a success notification or a failure notification from the online service and notifies the transaction device. The TDIS may also notify a user and vendor via email, text, phone call or in some other way. In a block 228, the transaction device receives the success notification or the failure notification from the TDIS and notifies the user.

Figure 17A:
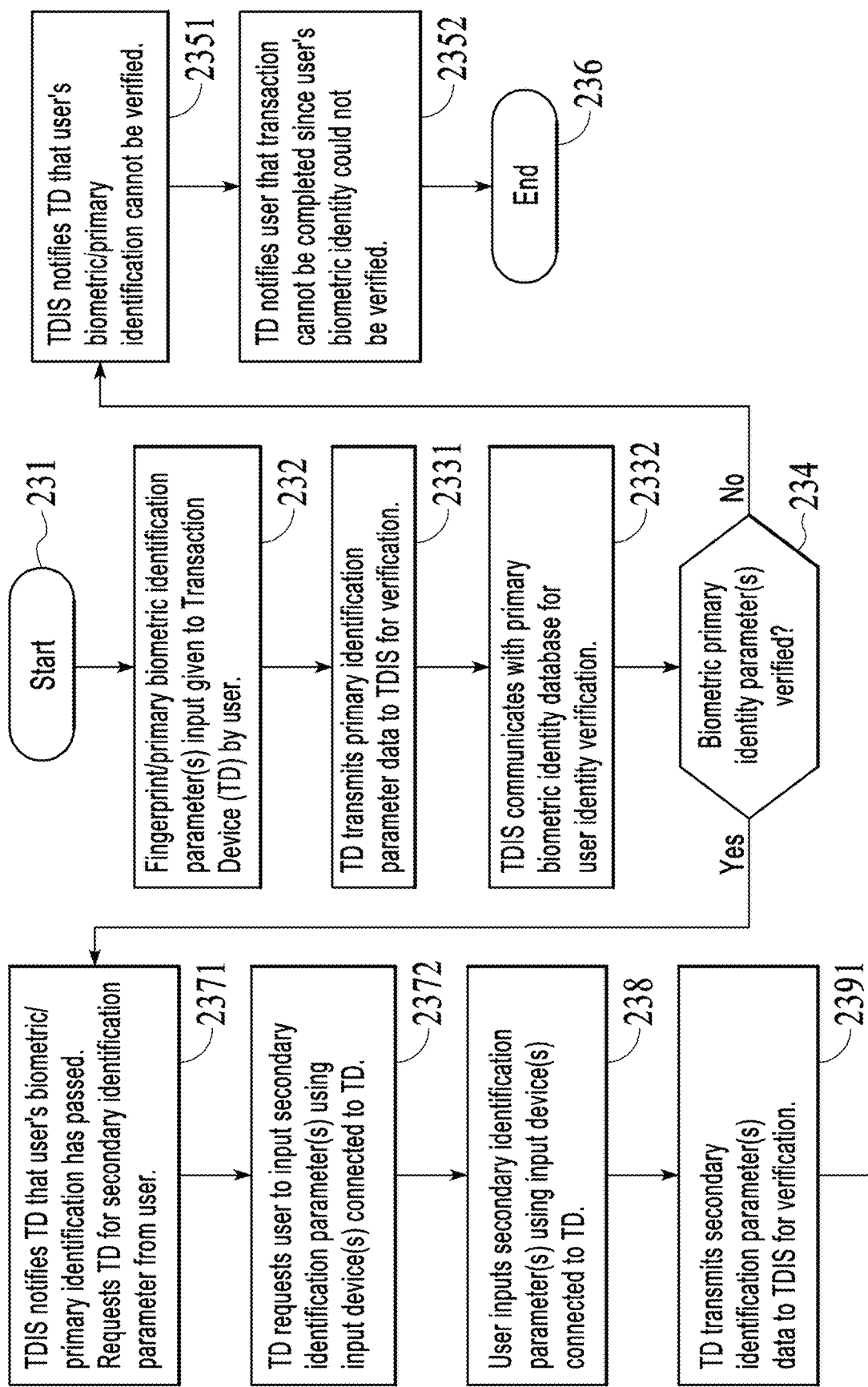
FIG. 17A, FIG. 17B and FIG. 17C are a more detailed flowchart for a transaction device in accordance with another alternative implementation.
Figure 17B:
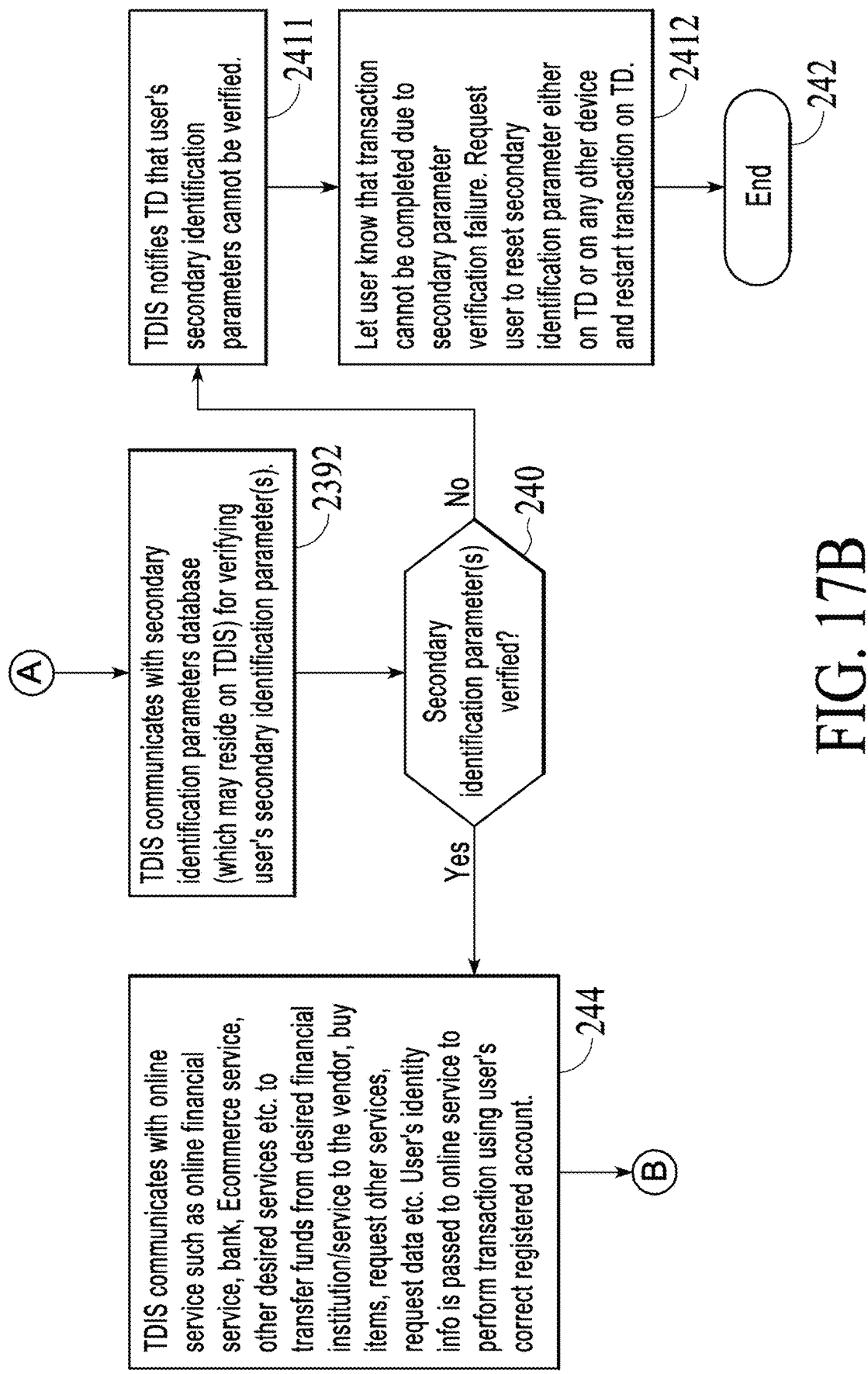
Figure 17C:
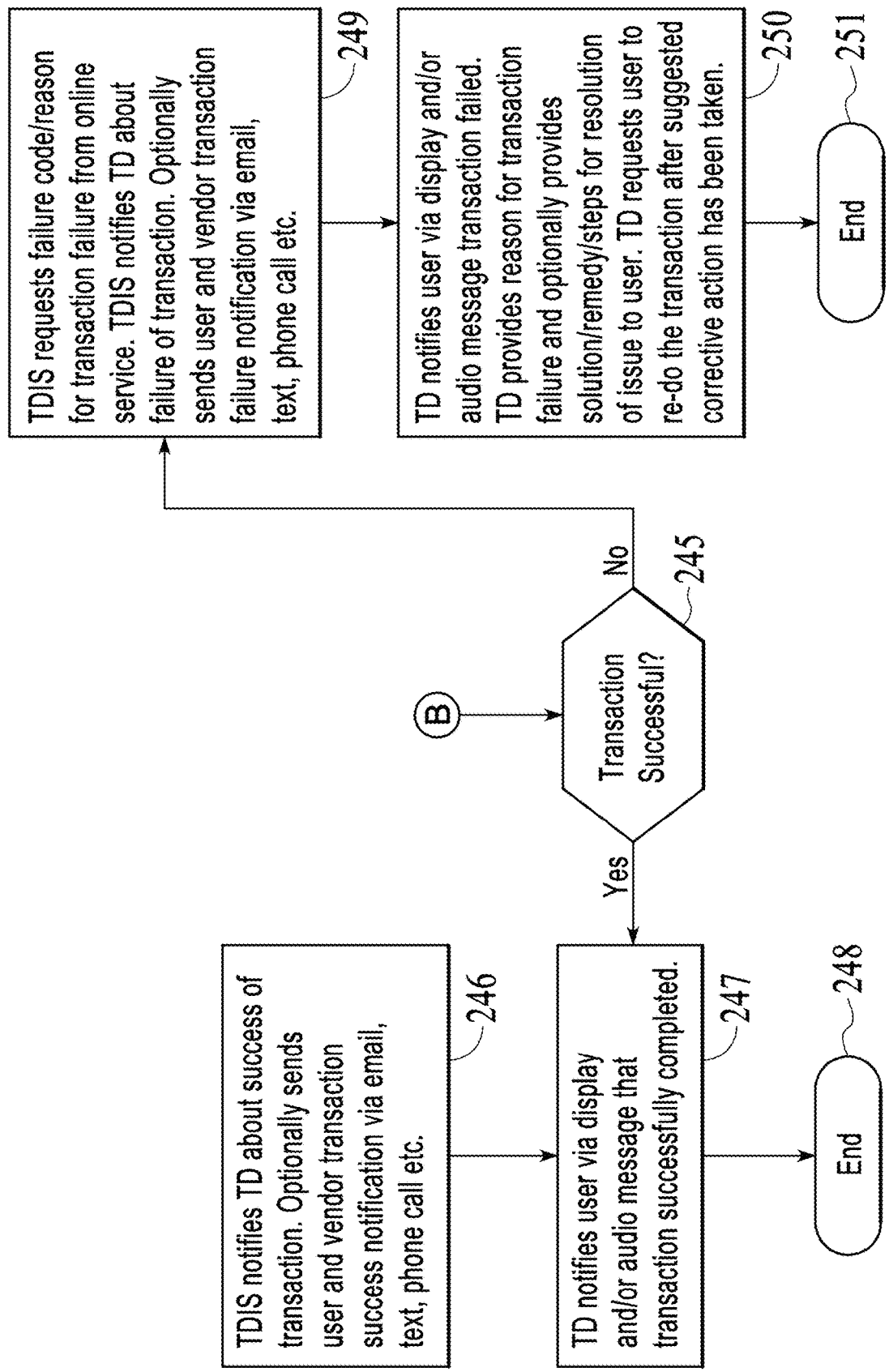

FIG. 17A, FIG. 17B and FIG. 17C are a more detailed flowchart for a transaction device within the third example architecture of a transaction device system as shown in FIG. 15. The process starts in a block 231. In a block 232, the primary biometric identity parameter is received from the user by the transaction device. In a block 2331, the transaction device transmits the primary identification parameter data to the TDIS for verification. In a block 2332, the TDIS communicates with the primary biometric identity parameter database for verification. In a block 234, a check is made to verify the biometric primary identity parameter. If the biometric primary identity parameter is not verified, in a block 2351, the TDIS notifies the transaction device that the user's biometric/primary identification cannot be verified. TDIS optionally notifies user and vendor via email, text message, phone call or other method about failure of primary biometric identity data verification. In a block 2352, transaction device notifies the user that the transaction cannot be completed because the biometric identity could not be verified. In a block 236, the process ends.

If the biometric primary identity parameter is verified, in a block 2371, the TDIS notifies the transaction device that the user's biometric/primary identification has passed. The TDIS requests the transaction device for a secondary identification parameter from the user. In a block 2372, the transaction device requests the user to input a secondary identification parameter using an input device connected to the transaction device. In a block 238, the transaction device receives the secondary identification parameter(s) from the user though an input device connected to the transaction device. In a block 2391, the transaction device transmits the secondary identification parameter(s) to the TDIS for verification. In a block 2392, the TDIS communicates with the secondary identity parameter database for verification. In a block 240, a check is made to verify the secondary identity parameter. If the secondary identity parameter is not verified, in a block 2411, the TDIS notifies the transaction device that the user's biometric/primary identification cannot be verified. TDIS optionally notifies user and vendor via email, text message, phone call or other method about failure of secondary biometric identity data verification. In a block 2412, the transaction device notifies the user that the transaction cannot be completed because the secondary identity parameter verification failed. The transaction device requests the user to reset the secondary identification parameter either on the transaction device or on another device and to restart the transaction on the transaction device. In a block 242, the process ends.

If the secondary identity parameter is verified, in a block 244, the TDIS communicates with the online service to perform the requested transaction. For example, the online service is an online financial service, a bank, an ecommerce service, airport security service or some other type of online service. For example, the transaction is to transfer funds from an online service to a vendor, buy items, to request other services, to request data, verify passenger's identity/passport/ticket or some other task. The user's identity information is passed to the online service to perform the transaction using the user's correct registered account.

In a block 245, a check is made to verify the transaction was successful. If the transaction is successful, in a block 246, the TDIS notifies the transaction device of the successful transaction. Optionally, the TDIS can send the user and the vendor a transaction success notification via email, text, phone call, or in some other way. In a block 247, the transaction device notifies the user, for example, via a display and/or an audio message, that the transaction was successfully completed. In a block 248, the process is complete.

If the transaction is not successful, in a block 249, the TDIS requests from the online service a failure code or reason for the transaction failure. The TDIS notifies the transaction device of the failed transaction. Optionally, the TDIS can send the user and the vendor a transaction failure notification via email, text, phone call, or in some other way.

In a block 250, the transaction device notifies the user, for example, via a display and/or an audio message, that the transaction was not successfully completed. For example, the transaction device provides reasons for the transaction failure and optionally suggests a solution, remedy or steps for resolution to the user. For example, the transaction device requests the user to repeat the transaction after suggested corrective action has been taken. In a block 251, the process ends.

Figure 18A:
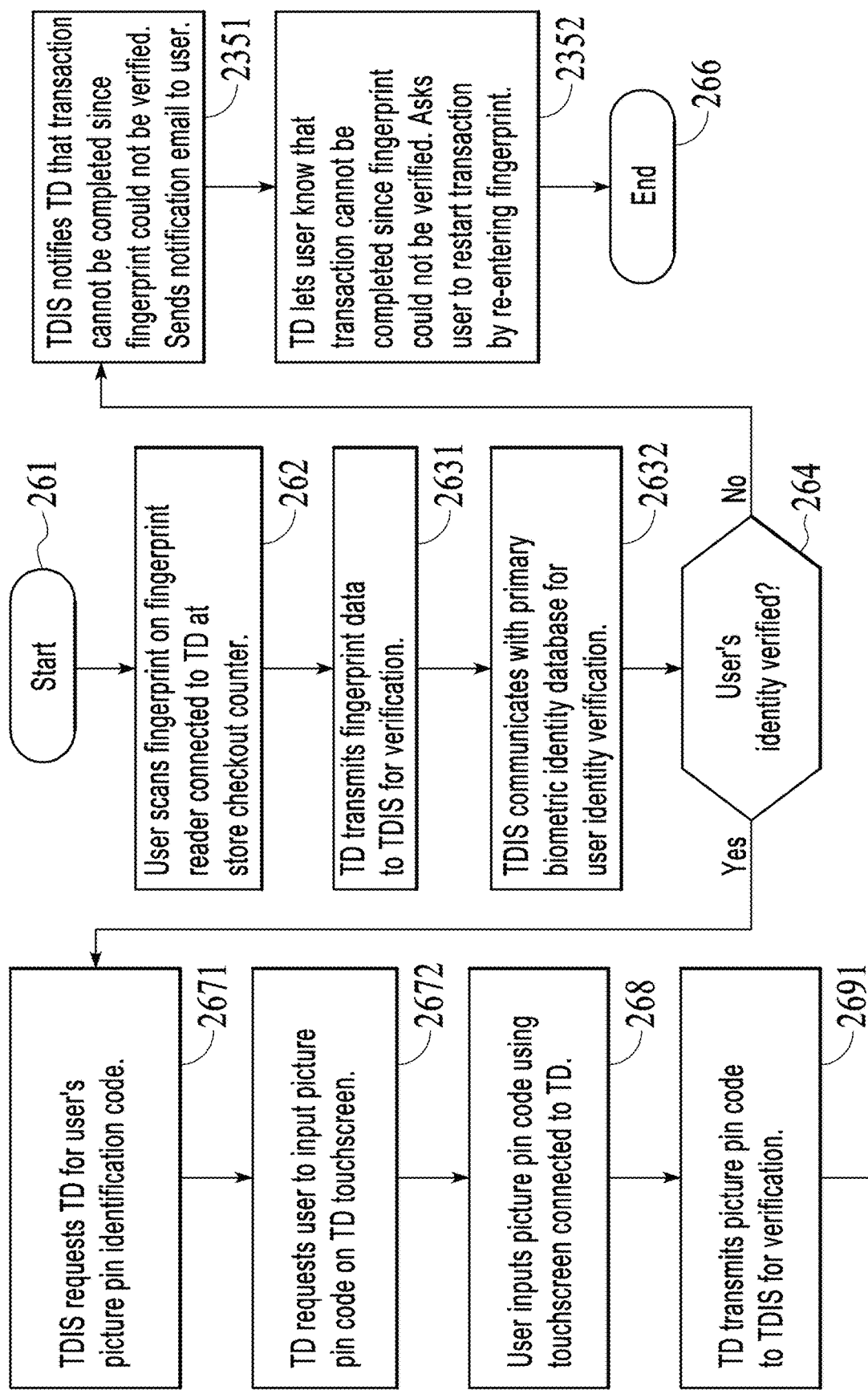
FIG. 18A, FIG. 18B and FIG. 18C are a flowchart illustrating a payment transaction using a transaction device in accordance with an alternative implementation.
Figure 18B:
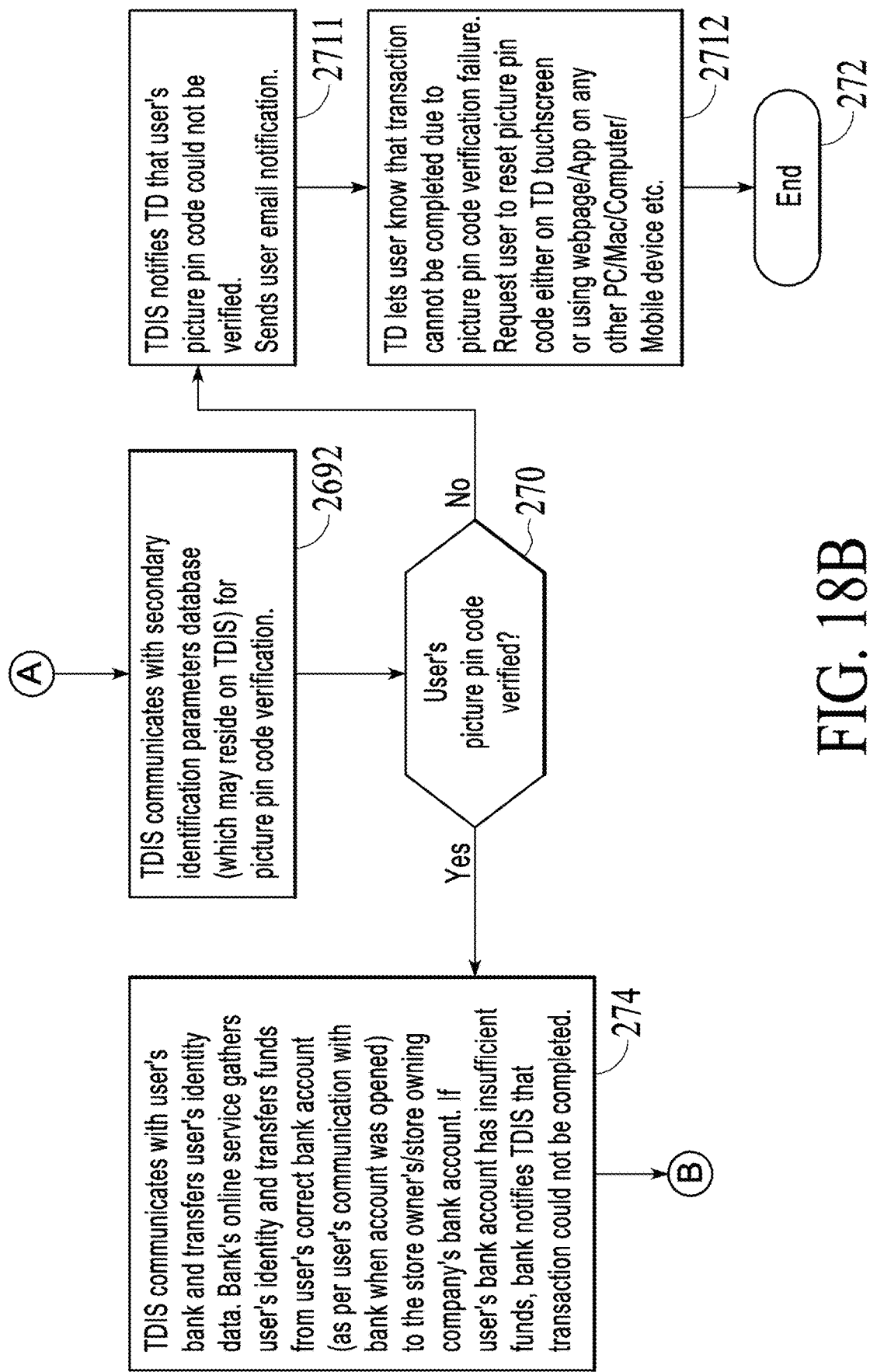
Figure 18C:
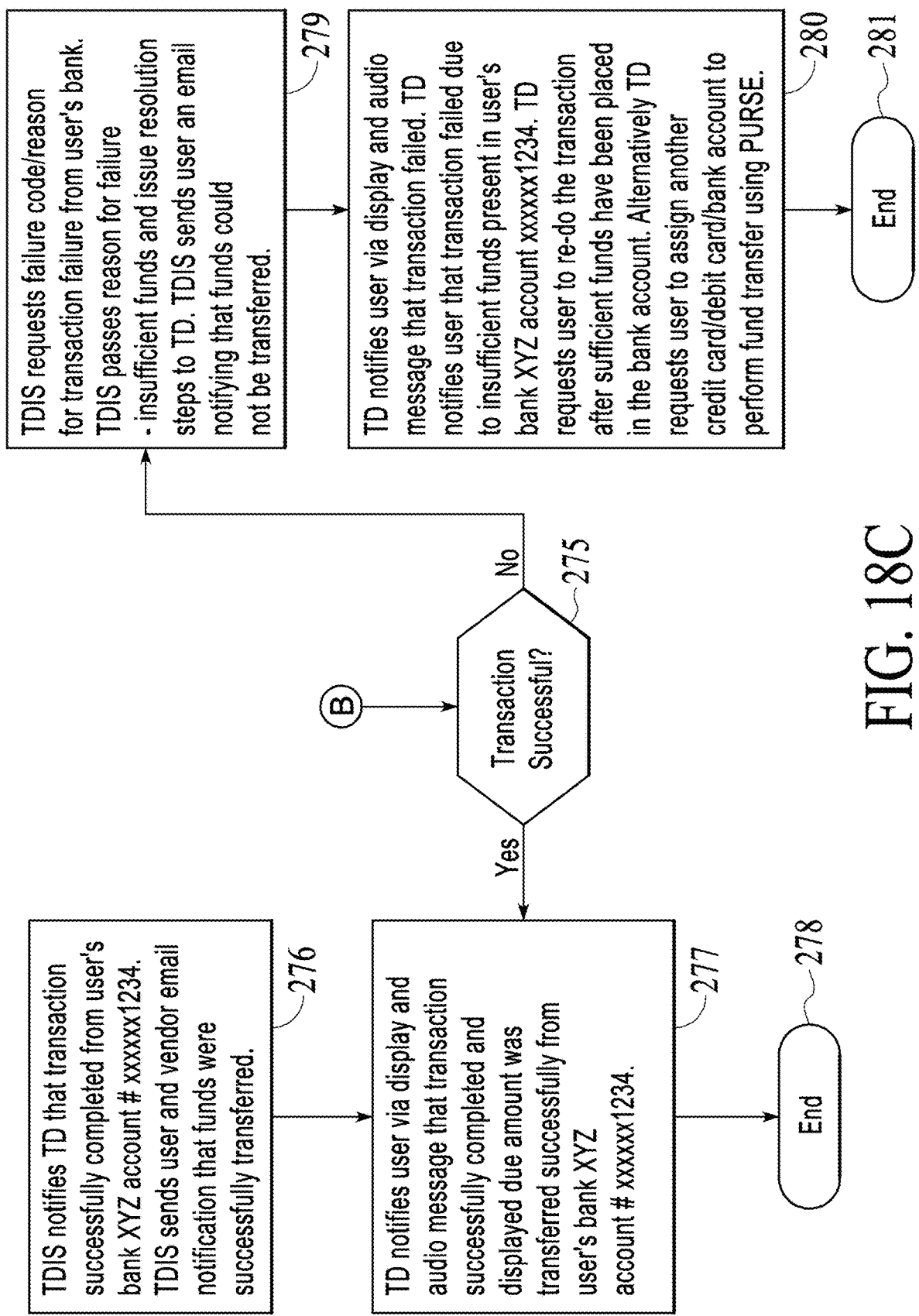

FIG. 18A, FIG. 18B and FIG. 18C illustrate an example commercial transaction performed within the third example architecture of a transaction device system as shown in FIG. 15 where a user makes a payment at a department store. The process starts in a block 261. In a block 262, the user scans a fingerprint on the fingerprint reader connected to the transaction device at a store checkout counter. In a block 2631, the transaction device transmits the fingerprint to the TDIS for verification. In a block 2632, the TDIS communicates with the primary biometric identity parameter database for verification. In a block 264, a check is made to verify the biometric primary identity parameter. If the biometric primary identity parameter is not verified, in a block 2651, the TDIS notifies the transaction device that the user's biometric/primary identification cannot be verified. In a block 2652, transaction device notifies the user that the transaction cannot be completed because the biometric identity could not be verified. The transaction device asks the user to restart the transaction by re-entering the fingerprint. In a block 266, the process ends.

If the biometric primary identity parameter is verified, in a block 2671, the TDIS notifies the transaction device that the fingerprint has passed. The TDIS requests the transaction device for the user's picture pin cod on the transaction device touchscreen. In a block 2672, the transaction device requests the user to input the user's picture pin code on the transaction device touchscreen. In a block 268, the transaction device receives the user's picture pin code though the touchscreen connected to the transaction device. In a block 2691, the transaction device transmits the user's picture pin code to the TDIS for verification. In a block 2692, the TDIS communicates with the secondary identity parameter database for verification of the user's picture pin code. In a block 270, a check is made to verify the user's picture pin code. If the user's picture pin code is not verified, in a block 2711, the TDIS notifies the transaction device that the user's picture pin code cannot be verified. TDIS sends user email notification that picture pin code could not be verified. In a block 2712, the transaction device notifies the user that the transaction cannot be completed because user's secondary identification parameter picture pin code verification failed. The transaction device requests the user to reset user's picture pin code either on the webpage, app using a computing device such as a smartphone, computing tablet, laptop computer, desktop computer, server computer or another type computing device. In a block 272, the process ends.

If the secondary identity parameter is verified, in a block 274, the TDIS communicates with the user's bank and transfers the user's identity data. The bank's online service gathers the user's identity and transfers funds from the user's correct bank account as per the user's communication with the bank when the account was opened or last configured to the department store's bank account. If the user's bank account has insufficient funds, the bank notifies the TDIS that the transaction could not be completed.

In a block 275, a check is made to verify the transaction was successful. If the transaction is successful, in a block 276, the TDIS notifies the transaction device of the successful transaction from an identified bank account. The TDIS sends the user and the vendor a transaction success notification via email. In a block 277, the transaction device notifies the user via a display that the transaction was successfully completed. The transaction device displays, for example, a bank identification and part of the account number to identify to the user the source of funds. In a block 278, the process is complete.

If the transaction is not successful, in a block 279, the TDIS requests from the online service a failure code or reason for the transaction failure. The TDIS notifies the transaction device of the failed transaction. For example, the transaction failed for insufficient funds and the TDIS sends the TDIS issue resolution steps. The TDIS also sends to the user an email notifying that funds could not be transferred. In a block 280, the transaction device notifies the user via a display and/or an audio message, that the transaction was not successfully completed due to insufficient funds present in an identified bank and account number partially identified to the user. The transaction device request the user to redo the transaction after sufficient funds have been placed in the bank account. Alternatively, the transaction device requests the user to assign another credit card, debit card or bank account to perform the fund transfer.

Figure 19:
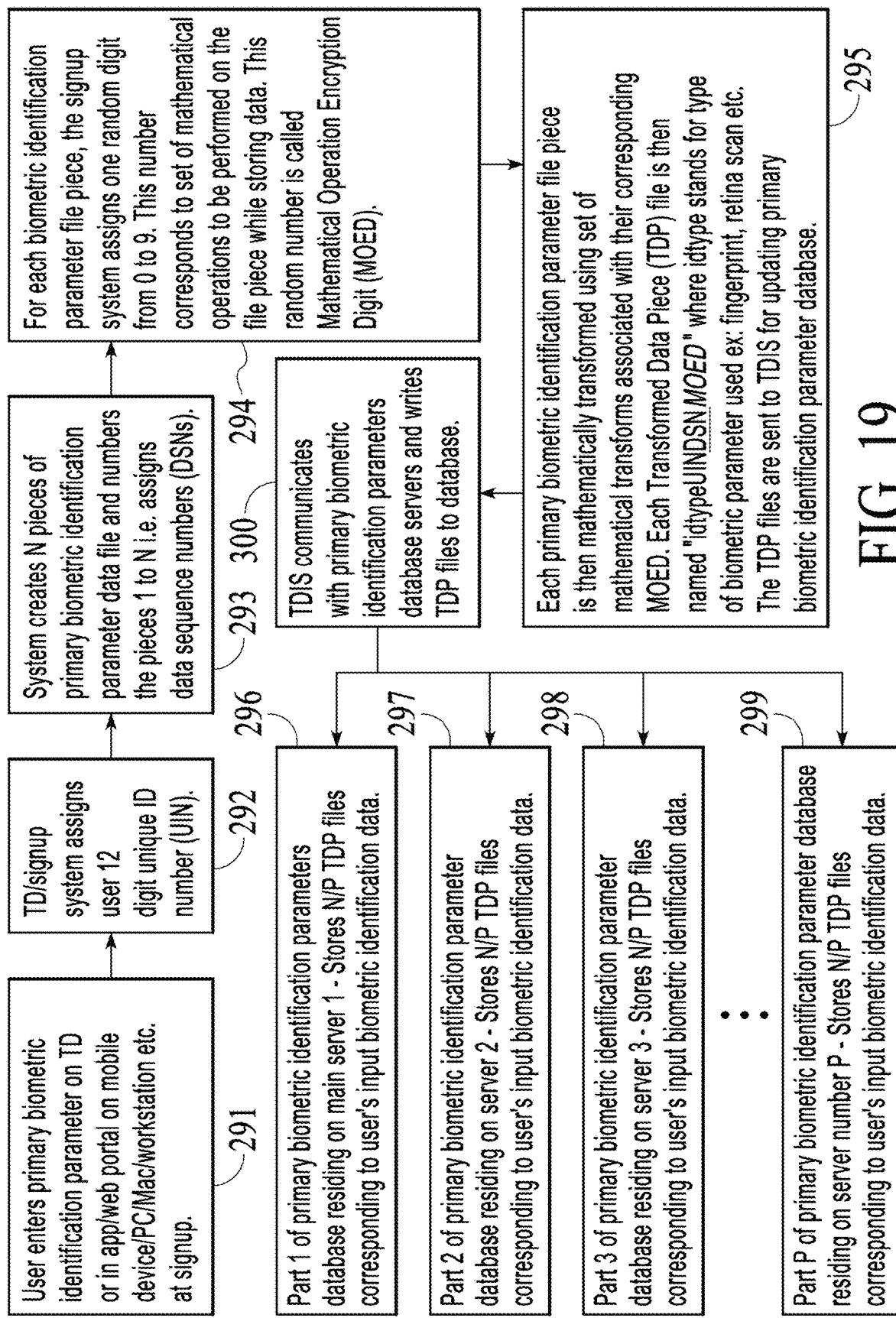
FIG. 19 illustrates identification parameter data storage flow at a new user signup for a transaction device in accordance with another implementation.

FIG. 19 illustrates identification parameter data storage flow at a new user signup for a transaction device for the architecture shown in FIG. 15. In a block 291, at sign-up, a user enters a primary biometric identification on a TD, an app, or a web portal accessed from a computing device such as a smartphone, tablet computer, laptop computer, desktop computer, work station or some other computing system. In a block 292, the transaction device or web portal or other manifestation of signup system assigns the user a unique identification number (UIN). For example, the UIN is twelve digits. In a block 293, the system fragments user input biometric identification parameter data by breaking up user's primary biometric identification parameter data file into N number of pieces. For example, each file piece receives a data sequence number (DSN) from 1 to "N" where "N" is the number of pieces. In a block 294, for each biometric identification parameter file piece, the signup system assigns one random digit from 0 to 9. This number corresponds to the set of mathematical operations to be performed on the file piece while storing data. This random number is called a mathematical operation encryption digit (MOED) or more generally, to cover cases where there are other than ten sets of mathematical operations, the random number can be called a mathematical operation encryption number (MOEN). In a block 295, each primary biometric identification parameter file piece is then mathematically transformed using set of mathematical transforms associated with their corresponding MOED. Each transformed data piece (TDP) file is then named "idtypeUINDSNMOED" where idtype stands for type of biometric parameter used. For example, the type of biometric parameter used is a fingerprint, a retina scan or some other type of biometric parameter. The TDP files are sent to the TDIS for updating the primary biometric identification parameter database. In a block 300, the TDIS communicates with the primary biometric identification parameter database to store user's biometric identification data.

The "N" pieces are stored on "P" servers so that each server so that N is greater than P and each server stores N/P pieces. For example, block 296 represents part one of the primary biometric identification parameter database residing on a first main server that stores N/P TDP files corresponding to the user's input biometric identification data. Block 297 represents part two of the primary biometric identification parameter database residing on a second server that stores N/P TDP files corresponding to the user's input biometric identification data. Block 298 represents part three of the primary biometric identification parameter database residing on a third server that stores N/P TDP files corresponding to the user's input biometric identification data. And so on until block 299 represents part "P" of the primary biometric identification parameter database residing on a "$P^{th}$" server that stores N/P TDP files corresponding to the user's input biometric identification data.

Figure 20B:
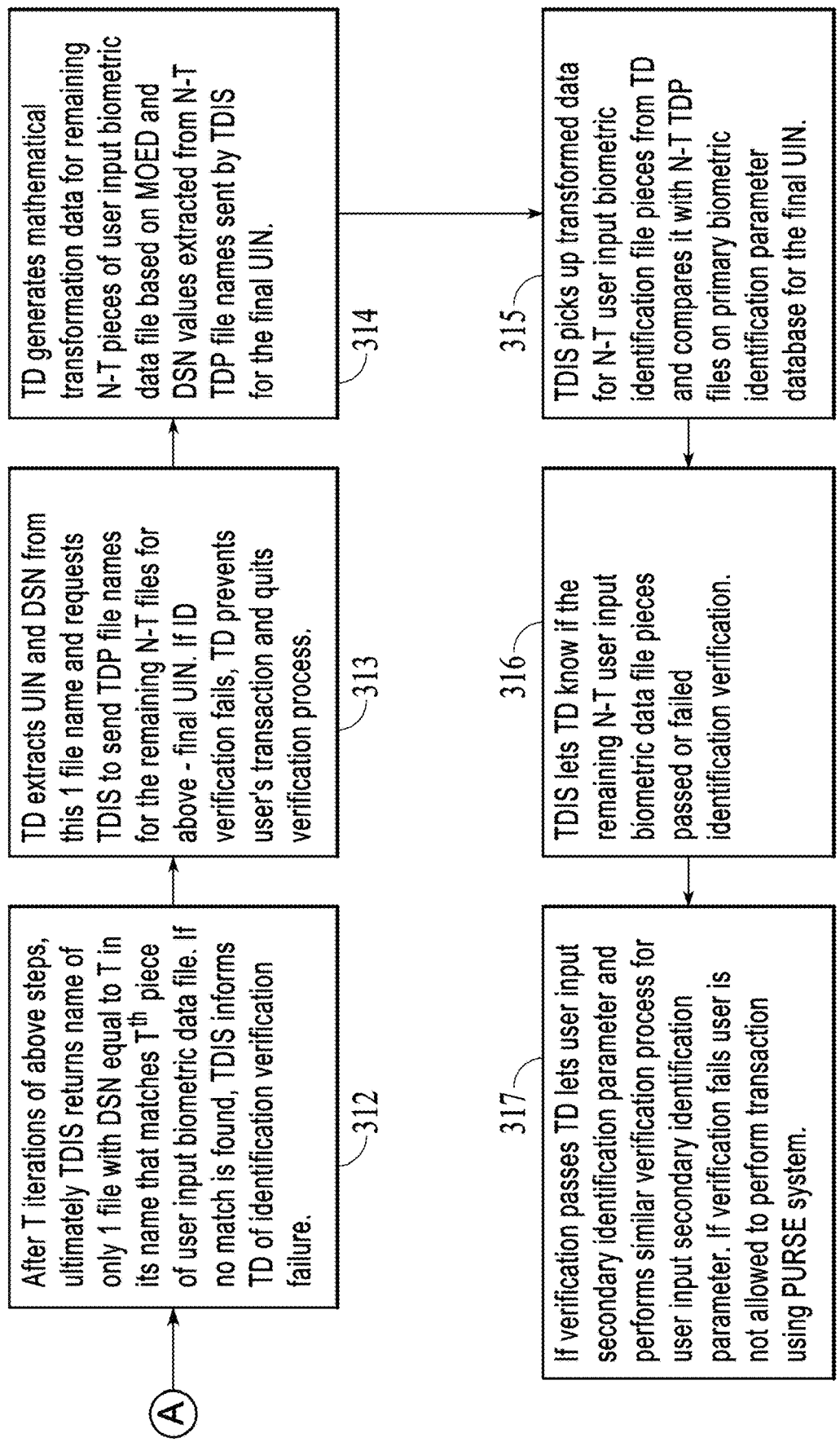

FIG. 20A and FIG. 20B illustrate verification of a user biometric identity during a transaction using a transaction device in the architecture shown in FIG. 15. In a block 301, a user enters a primary biometric identification parameter on a transaction device. In a block 302, the transaction device fragments the biometric identity data file into "N" pieces. In a block 303, the transaction device runs mathematical transformation for MOEDs 0 to 9 on a first piece of user input biometric data file out of the N pieces and generates 10 transformed data files for verification with the biometric identification parameters database. In a block 304, the TDIS picks up the data and matches it with the primary biometric identity database and finds matches on the database by communication with all "P" primary biometric identity database servers. In a block 305, the TDIS returns names of all "Q" number of TDP files that match the first user input biometric data field piece on the transaction device and that have their DSN name field equal to 1 in their names. If no match is found, the TDIS informs the transaction device of the identification failure.

In a block 306, the transaction device extracts the UIN and the DSN values of the received Q TDP file names from the primary biometric identity database main server. If identification verification fails, the transaction device prevents the user's transaction and quits the verification process. In a block 307, the transaction device runs a mathematical transformation for MOEDs 0 to 9 on a second piece of user input biometric data file. The ten transformed data files are sent to the primary biometric identity database server to compare with TDP files with names that contain UINs extracted in block 306 and where DSN is equal to two in the TDP file name. In a block 308, the TDIS picks up data and finds matches on the primary biometric identification parameters database by communicating with all P primary biometric parameter identity database servers. In a block 309, the TDIS returns names of all R (where R is less than Q) number of TDP files that match the second user input biometric data file piece on the transaction device and that have their DSN name field equal to two in their names. If no match is found, the TDIS informs the transaction device of an identification verification failure. In a block 310, the transaction device extracts the UIN and the DSN values of the received R TDP file names from the TDIS. If the identification verification fails, the transaction device prevents user's transaction and quits the verification process. In a block 311, the transaction device runs mathematical transformation of MOEDs 0 to 9 on third piece of user input biometric data file. The ten transformed data files are sent to TDIS to compare with TDP files on the primary biometric identity database servers with names that contain UINs extracted in the previous step and DSN equal to three in the TDP file name.

In a block 312, after T iterations of the above blocks, ultimately primary biometric identification parameter database main server returns a name of only one file with a DSN equal to T in its name that matches the $T^{th}$ piece of user input biometric parameter data file. If no match is found, the TDIS informs the transaction device of identification verification failure. In a block 313, the transaction device extracts the UIN and the DSN from the one file with DSN equal to T and requests the TDIS to send TDP file names for the remaining N-T files for the above, final UIN. If ID verification fails, the transaction device prevents the user's transaction and quits the verification process. In a block 314, the transaction device generates mathematical transformation data for the remaining (N minus T) pieces of user input biometric data file based on MOED and DSN values extracted from (N minus T) TDP file names sent by the TDIS for final UIN. In a block 315, the TDIS picks up transformed data for (N minus T) user input biometric identification file pieces from the transaction device and compares the picked up transformed data with (N minus T) TDP files on the primary biometric identification parameter database for the final UIN. In a block 316, the TDIS lets the transaction device know if the remaining (N minus T) user input biometric data file pieces passed or failed identification verification. In a block 317, if the verification passes, the transaction device lets the user input secondary identification parameter and performs a similar verification process for the user input secondary identification parameter. If verification fails, the user is not allowed to perform the transaction using the system.

Figure 21:
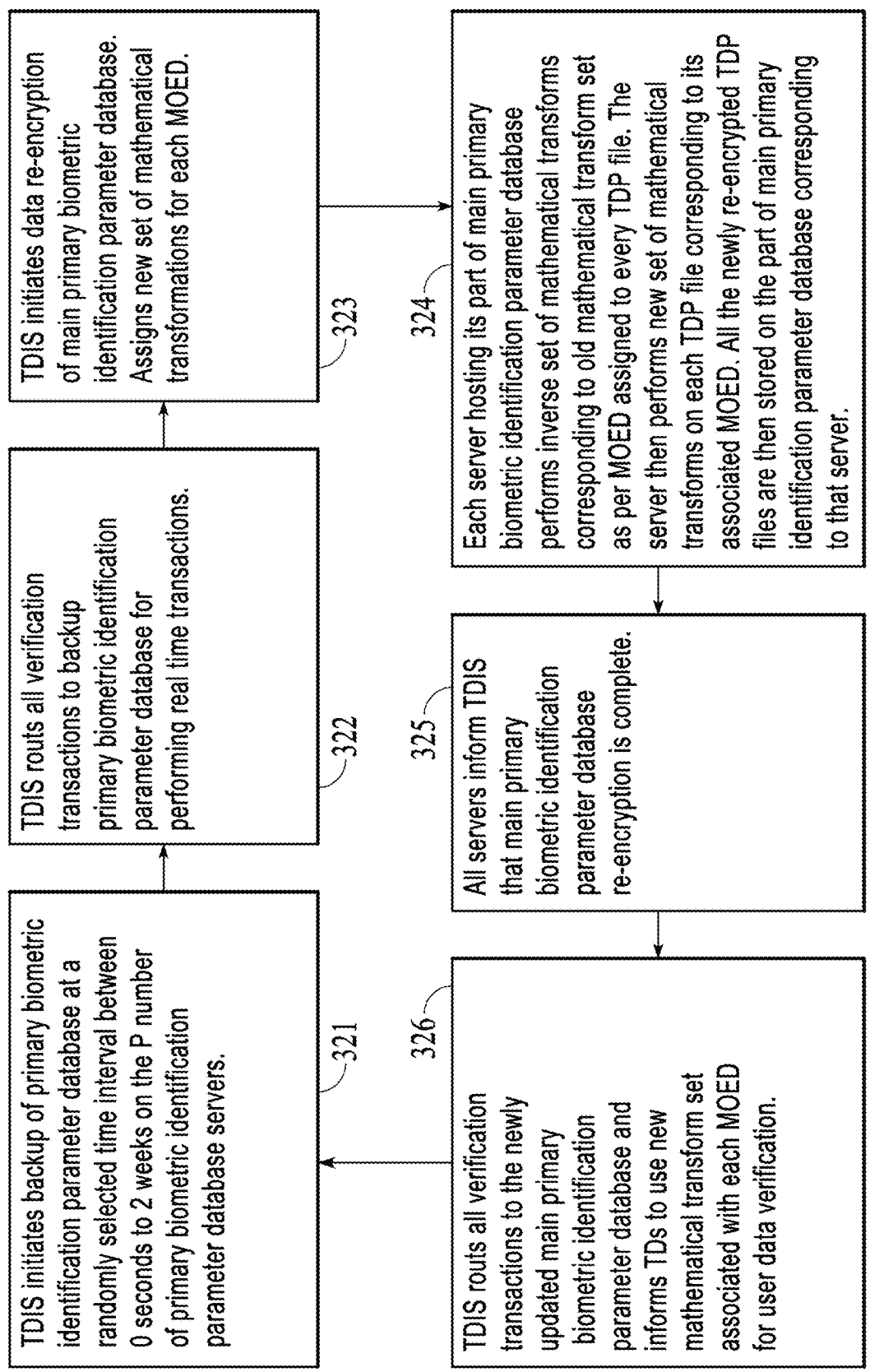
FIG. 21 re-encrypting of an identification parameter database for a transaction device in accordance with an implementation.

FIG. 21 illustrates re-encrypting of an identification parameter database for a transaction device. In a block 321, the TDIS initiates backup of the primary biometric identification parameter database at a randomly selected time interval on the P primary biometric identification parameter database servers. For example, the randomly selected time interval is between zero seconds and two weeks. The primary biometric identification parameter database is located on the P number of primary biometric identification parameter database servers. In a block 322, the TDIS routes all verification transactions to the backup primary biometric identification parameter database for performing real time transactions. In a block 323, the TDIS initiates data re-encryption of the main primary biometric identification parameter database. The TDIS also assigns a new set of mathematical transformations for each MOED. In a block 324, each server hosting part of the main primary biometric identification parameter database performs an inverse set of mathematical transforms corresponding to old mathematical transform set as per the MOED assigned to every TDP file. The server then performs a new set of mathematical transforms on each TDP file corresponding to its associated MOED. All the newly re-encrypted TDP files are then stored on the part of the main primary identification parameter database corresponding of that server. In a block 325, all servers inform the TDS that the main primary biometric identification parameter database re-encryption is complete. In a block 326, the TDIS routes all verification transactions to the newly updated main primary biometric identification parameter database and informs the TDs to use the new mathematical transform set associated with each MOED for user data verification. For example, the same data storage, encryption, verification and re-encryption procedure applies to secondary identification parameters.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. A transaction device used for performing transactions, comprising:
   a keypad;
   a display screen that displays information about a purchase of goods or services, the information being displayed to a user of the transaction device;
   a camera;
   a finger print scanner, the finger print scanner including:
      a finger print sensor, and
      a hood that forms a cavity for the print sensor, the hood serving to reduce ambient light that strikes the finger print sensor;
   attachments that serve as attachment points to physically anchor and secure the transaction device to a surface or stationary object;
   a transaction device computer that implements communication channels to the keypad, the display screen, the camera and the finger print scanner;
   a communication interface to a primary biometric identification database that stores data on a plurality of primary biometric identification database servers;
   a communication interface to a secondary identification parameters database;
   an interface to financial services including at least a bank or a credit card processing service;
   wherein an identification parameter which is primary identification data that is captured from a user by the camera, the keyboard or the fingerprint scanner and after capture is verified by the transaction device accessing at least two primary biometric identification database servers to separately verify fragmented pieces of the identification parameter, including the following substeps:
      (a) receiving, by the transaction device from the user, the primary identification data, which identifies the user, including at least one of the following:
         using the fingerprint reader to receive at least one fingerprint from the user,
         using the camera mounted adjacent to the display to capture an image of the user,
      (b) creating a plurality of pieces of an identification parameter data file;
      (c) transforming a first piece into a first plurality of transformed verification pieces, each transformed verification piece resulting from encrypting the first piece using a mathematical encryption operation from a plurality of mathematical encryption operations, wherein the mathematical encryption operation used to encrypt the piece is different for each transformed verification piece in the first plurality of transformed verification pieces and wherein the first piece has a first data sequence number,
      (d) searching the primary biometric identification database for a stored transformed data piece that matches any transformed verification piece in the first plurality of transformed verification pieces,
      (e) returning an identification failure when there is a stored transformed data piece that matches a transformed verification piece in the first plurality of transformed verification pieces, but a stored data sequence number stored with the stored transformed data piece does not match the first data sequence number, so that all files in the primary biometric identification database where there is a stored transformed data piece that matches a transformed verification piece in the first plurality of transformed verification pieces, and a stored data sequence number stored with the stored transformed data piece that matches the first data sequence number, are matched files,
      (f) transforming a second piece into a second plurality of transformed verification pieces, each transformed verification piece resulting from encrypting the second piece using a mathematical encryption operation from a plurality of mathematical encryption operations, wherein the mathematical encryption operation used to encrypt the piece is different for each transformed verification piece in the second plurality of transformed verification pieces and wherein the second piece has a second data sequence number,
      (g) searching the matched files in the primary biometric identification database for a stored transformed data piece that matches any transformed verification piece in the second plurality of transformed verification pieces,
      (h) returning an identification failure when there is no stored transformed data piece that matches any transformed verification piece in the second plurality of transformed verification pieces,
      (i) returning an identification failure when there is a stored transformed data piece that matches a transformed verification piece in the second plurality of transformed verification pieces, but a stored data sequence number stored with the stored transformed data piece does not match the second data sequence number, so that all files in the matched files where there is a stored transformed data piece that matches a transformed verification piece in the second plurality of transformed verification pieces, and a stored data sequence number stored with the stored transformed data piece that matches the second data sequence number, are now the matched files,
      (j) repeating substeps (f), (g), (h) and (i) for any remaining pieces in the plurality of pieces, until an identification failure is returned or until all remaining pieces in the plurality of pieces are processed without returning an identification failure, and
      (k) when substeps (a) through (j) are performed without returning an identification failure, returning an identification success; and
      (l) providing a transaction success message, by the transaction device to the user, when the online service agrees to process the transaction;
   wherein stored transformed data pieces for the identification parameter are stored over more than one of the plurality of primary biometric identification database servers.

2. A transaction device as in claim 1, wherein the identification parameter is at least one of the following received from the user:
   a fingerprint;
   a retina scan;
   a body temperature profile scan;
   DNA data;
   voice recognition
   face recognition.

3. A transaction device as in claim 1, wherein:
the transaction device verifies the identification parameter to verify identification of the user; and,
the transaction device forwards the request to an online service to process the transaction when the identification parameter verifies identification of the user.

4. A transaction device as in claim 1, wherein the secondary identification parameters database is stored on a plurality of servers so that stored transformed data pieces are distributed among the plurality of servers d.

5. A transaction device as in claim 1 wherein the secondary identification parameters database is stored on a plurality of servers so that stored transformed data pieces are distributed among the plurality of servers.

6. A transaction device as in claim 1 wherein a secondary identification parameter using a secondary identification parameter data file is fragmented, transformed and stored among the plurality of servers.

7. A transaction device as in claim 1:
wherein the transaction device is implemented as a two-part system, a first part being transaction device that is physically accessible to the user and a second part being a transaction device interface server which interfaces with the transaction data device but is not otherwise accessible to the user.

8. A transaction device, comprising:
a keypad;
a display screen that displays information about a purchase of goods or services, the information being displayed to a user of the transaction device;
a camera;
a microphone;
attachments that serve as attachment points to physically anchor and secure the transaction device to a building;
a transaction device computer that implements communication channels to the keypad, the display screen, the camera and the finger print scanner;
a communication interface to a primary biometric identification database;
a communication interface to a secondary identification parameters database;
an interface to financial services including at least a bank or a credit card processing service;
wherein an identification parameter which is identification data that is captured from a user by the camera, the keyboard or the microphone and after capture is verified by the transaction device separately verifying fragmented pieces of the identification parameter, including the following substeps:
(a) receiving, by the transaction device from the user, secondary identification data, which identifies the user, including at least one of the following:
using the microphone to receive audio input from the user,
using the camera mounted adjacent to the display to capture an image of the user,
(b) creating a plurality of pieces of an identification parameter data file;
(c) transforming a first piece into a first plurality of transformed verification pieces, each transformed verification piece resulting from encrypting the first piece using a mathematical encryption operation from a plurality of mathematical encryption operations, wherein the mathematical encryption operation used to encrypt the piece is different for each transformed verification piece in the first plurality of transformed verification pieces and wherein the first piece has a first data sequence number,
(d) searching the secondary identification parameters database for a stored transformed data piece that matches any transformed verification piece in the first plurality of transformed verification pieces,
(e) returning an identification failure when there is a stored transformed data piece that matches a transformed verification piece in the first plurality of transformed verification pieces, but a stored data sequence number stored with the stored transformed data piece does not match the first data sequence number, so that all files in the secondary identification parameters database where there is a stored transformed data piece that matches a transformed verification piece in the first plurality of transformed verification pieces, and a stored data sequence number stored with the stored transformed data piece that matches the first data sequence number, are matched files,
(f) transforming a second piece into a second plurality of transformed verification pieces, each transformed verification piece resulting from encrypting the second piece using a mathematical encryption operation from a plurality of mathematical encryption operations, wherein the mathematical encryption operation used to encrypt the piece is different for each transformed verification piece in the second plurality of transformed verification pieces and wherein the second piece has a second data sequence number,
(g) searching the matched files in the secondary identification parameters database for a stored transformed data piece that matches any transformed verification piece in the second plurality of transformed verification pieces,
(h) returning an identification failure when there is no stored transformed data piece that matches any transformed verification piece in the second plurality of transformed verification pieces,
(i) returning an identification failure when there is a stored transformed data piece that matches a transformed verification piece in the second plurality of transformed verification pieces, but a stored data sequence number stored with the stored transformed data piece does not match the second data sequence number, so that all files in the matched files where there is a stored transformed data piece that matches a transformed verification piece in the second plurality of transformed verification pieces, and a stored data sequence number stored with the stored transformed data piece that matches the second data sequence number, are now the matched files,
(j) repeating substeps (f), (g), (h) and (i) for any remaining pieces in the plurality of pieces, until an identification failure is returned or until all remaining pieces in the plurality of pieces are processed without returning an identification failure, and
(k) when substeps (a) through (j) are performed without returning an identification failure, returning an identification success; and
wherein secondary identification data from information captured from the user by the camera, the keyboard or the microphone is verified against secondary identification information stored in the secondary identification parameters database before providing a transaction success message, by the transaction device to the user, indicating the online service agrees to process the transaction; and wherein the secondary identification parameters database is stored on a plurality of servers.

9. A transaction device as in claim 8, wherein secondary identity data in the secondary data base is re-encrypted at random time intervals to prevent hacking.

10. A transaction device as in claim 8:

wherein the transaction device is implemented as a two-part system, a first part being transaction device that is physically accessible to the user and a second part being a transaction device interface server which interfaces with the transaction data device but is not otherwise accessible to the user.

11. A transaction device as in claim 8, wherein the transaction device is implemented as a transaction device that is physically accessible to the user so that access interface to the secondary identification parameters database, and the request interface all are incorporated as part of the transaction device.

12. A transaction device as in claim 8:

wherein the transaction device is implemented as a two-part system, a first part being transaction device that is physically accessible to the user and a second part being a transaction device interface server which interfaces with the transaction data device but is not otherwise accessible to the user; and, wherein the access interface to the secondary identification parameters database is incorporated as part of the transaction device while the request interface is part of the transaction device interface server.

13. A transaction device as in claim 8:

wherein the transaction device is implemented as a two-part system, a first part being transaction device that is physically accessible to the user and a second part being a transaction device interface server which interfaces with the transaction data device but is not otherwise accessible to the user; and wherein the access interface to the secondary identification parameters database, and the request interface are all incorporated as part of the transaction device interface server.

14. A transaction device as in claim 8, additionally comprising:

verifying a secondary identification parameter when an identification success is returned.

15. A transaction device as in claim 8 wherein a primary identification parameter using a primary identification parameter data file is fragmented, transformed and stored among the plurality of servers.

16. A transaction device used for performing transaction comprising:

a keypad;

a display screen that displays information about a purchase of goods or services, the information being displayed to a user of the transaction device;

a camera;

a finger print scanner, the finger print scanner including a finger print sensor that is able to simultaneously scan more than one fingerprint;

attachments that serve as attachment points to physically anchor and secure the transaction device to a surface or stationary object;

a transaction device computer that implements communication channels to the keypad, the display screen, the camera and the finger print scanner;

a communication interface to a primary biometric identification database that stores data on a plurality of primary biometric identification database servers;

a communication interface to a secondary identification parameters database;

an interface to financial services including at least a bank or a credit card processing service;

wherein an identification parameter which is identification data that is captured from a user by the camera, the keyboard or the fingerprint scanner and after capture is verified by the transaction device accessing at least two primary biometric identification database servers to separately verify fragmented pieces of the identification parameter, including the following substeps:

(a) receiving, by the transaction device from the user, primary identification data, which identifies the user, including at least one of the following:

using the fingerprint reader to receive at least one fingerprint from the user, using the camera mounted adjacent to the display to capture an image of the user, (b) creating a plurality of pieces of an identification parameter data file;

(c) transforming a first piece into a first plurality of transformed verification pieces, each transformed verification piece resulting from encrypting the first piece using a mathematical encryption operation from a plurality of mathematical encryption operations, wherein the mathematical encryption operation used to encrypt the piece is different for each transformed verification piece in the first plurality of transformed verification pieces and wherein the first piece has a first data sequence number, (d) searching the primary biometric identification database for a stored transformed data piece that matches any transformed verification piece in the first plurality of transformed verification pieces, (e) returning an identification failure when there is a stored transformed data piece that matches a transformed verification piece in the first plurality of transformed verification pieces, but a stored data sequence number stored with the stored transformed data piece does not match the first data sequence number, so that all files in the primary biometric identification database where there is a stored transformed data piece that matches a transformed verification piece in the first plurality of transformed verification pieces, and a stored data sequence number stored with the stored transformed data piece that matches the first data sequence number, are matched files, (f) transforming a second piece into a second plurality of transformed verification pieces, each transformed verification piece resulting from encrypting the second piece using a mathematical encryption operation from a plurality of mathematical encryption operations, wherein the mathematical encryption operation used to encrypt the piece is different for each transformed verification piece in the second plurality of transformed verification pieces and wherein the second piece has a second data sequence number, (g) searching the matched files in the primary biometric identification database for a stored transformed data piece that matches any transformed verification piece in the second plurality of transformed verification pieces, (h) returning an identification failure when there is no stored transformed data piece that matches any transformed verification piece in the second plurality of transformed verification pieces, (i) returning an identification failure when there is a stored transformed data piece that matches a transformed verification piece in the second plurality of transformed verification pieces, but a stored data sequence number stored with the stored transformed data piece does not match the second data sequence number, so that all files in the matched files where there is a stored transformed data piece that matches a transformed verification piece in the second plurality of transformed verification pieces, and a stored data sequence number stored with the stored transformed data piece that matches the second data sequence number, are now the matched files, (j) repeating substeps (f), (g), (h) and (i) for any remaining pieces in the plurality of pieces, until an identification failure is returned or until all remaining pieces in the plurality of pieces are processed without returning an identification failure, and (k) when substeps (a) through (j) are performed without returning an identification failure, returning an identification success; and (l) providing a transaction success message, by the transaction device to the user, when the online service agrees to process the transaction;

wherein the primary biometric identification database is re-encrypting periodically at intervals of time, including:
  using a backup primary biometric identification parameter database to allow performance real time transactions during the re-encrypting,
  initiating data re-encryption of the main primary biometric identification parameter database including assigning a new set of mathematical transformations, performing inverse mathematical transforms on data within the primary biometric identification database and on data resulting from the inverse mathematical transforms, performing new mathematical transforms,
  storing data resulting from the new mathematical transforms in the primary biometric identification database, and
  using primary biometric identification parameter database to perform real time transactions after the re-encrypting.

17. A transaction device as in claim 16, wherein the primary biometric identification parameter is at least one of the following received from the user:
  a fingerprint;
  a retina scan;
  a body temperature profile scan;
  DNA data;
  voice recognition
  face recognition.

18. A transaction device as in claim 16, wherein:
  the transaction device verifies the identification parameter to verify identification of the user; and,
  the transaction device forwards the request to an online service to process the transaction when the identification parameter verifies identification of the user.

19. A transaction device as in claim 16, additionally comprising:
  verifying a secondary identification parameter when the identification success is returned.

20. A transaction device as in claim 16 wherein the secondary identification parameters database is stored on a plurality of servers so that stored transformed data pieces are distributed among the plurality of servers.

* * * * *